(12) United States Patent
Fass et al.

(10) Patent No.: US 11,699,118 B2
(45) Date of Patent: *Jul. 11, 2023

(54) SYSTEMS AND METHODS FOR ANALYZING PRODUCT MOVEMENT INFORMATION AND GENERATING COMPLIANCE PROFILES

(71) Applicant: Registrar Corp., Hampton, VA (US)

(72) Inventors: Thomas E. Fass, Newport News, VA (US); Jonathan R. Rhodes, Newport News, VA (US)

(73) Assignee: Registrar Corp., Hampton, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,805

(22) Filed: Dec. 1, 2021

(65) Prior Publication Data
US 2022/0092494 A1    Mar. 24, 2022

Related U.S. Application Data

(63) Continuation of application No. 16/752,229, filed on Jan. 24, 2020, now Pat. No. 11,222,293.

(51) Int. Cl.
*G06Q 10/0635* (2023.01)
*G06Q 30/018* (2023.01)
(Continued)

(52) U.S. Cl.
CPC ....... *G06Q 10/0635* (2013.01); *G06F 16/258* (2019.01); *G06Q 30/018* (2013.01);
(Continued)

(58) Field of Classification Search
CPC ............ G06F 1/00–21/00; G06Q 10/00–90/00
(Continued)

(56) References Cited

U.S. PATENT DOCUMENTS 7,312,702 B1 * 12/2007 Willms ................. G06Q 50/26
705/333
7,734,606 B2 * 6/2010 Walker ............. G06F 16/24556
707/999.102

(Continued)

FOREIGN PATENT DOCUMENTS

ID    2017027981    2/2017

OTHER PUBLICATIONS

"Entry Screening Systems and Tools", https://www.fda.gov/industry/import-systems/entry-screening-systems-and-tools#riskscore, Jan. 16, 2020.

(Continued)

*Primary Examiner* — Alan S Miller
(74) *Attorney, Agent, or Firm* — Clayton, McKay & Bailey, PC

(57) ABSTRACT

A system can aggregate product movement information from a plurality of external information sources and convert the information into provider transactions. Compliance events can be identified in the provider transactions and associated with controlling identifiers assigned to providers associated with the provider transactions from which the compliance events are identified. Risk factor scores can be generated for providers by applying a scoring system to the compliance events and final dispositions of provider transactions respectively associated with providers. A compliance profile can be generated for each provider based on the provider's risk factor scores. The provider's compliance profile can be requested with, transmitted to, and displayed by a graphical user interface operated by an individual or entity authorized to view that provider's compliance profile.

20 Claims, 12 Drawing Sheets

(51) Int. Cl.
   *G06Q 50/26*          (2012.01)
   *G06F 16/25*          (2019.01)
   *G06Q 50/28*          (2012.01)
   *G06F 3/0482*         (2013.01)

(52) U.S. Cl.
   CPC ............. *G06Q 50/26* (2013.01); *G06Q 50/28*
                    (2013.01); *G06F 3/0482* (2013.01)

(58) Field of Classification Search
   USPC .............................................. 705/7.11–7.42
   See application file for complete search history.

(56) References Cited

U.S. PATENT DOCUMENTS

| | | | | |
|---|---|---|---|---|
| 7,850,081 | B2* | 12/2010 | Swan | ................. G06Q 10/08 |
| | | | | 235/375 |
| 8,448,126 | B2 | 5/2013 | Laight | |
| 10,146,214 | B2* | 12/2018 | Linton | ............. G05B 19/41865 |
| 2007/0119929 | A1* | 5/2007 | Swan | ................. G06Q 10/08 |
| | | | | 340/572.1 |
| 2007/0226721 | A1 | 9/2007 | Laight | |
| 2008/0015913 | A1* | 1/2008 | Courtney | ............... G06Q 50/26 |
| | | | | 705/7.28 |
| 2009/0008450 | A1* | 1/2009 | Ebert | ..................... G06Q 10/08 |
| | | | | 235/439 |
| 2009/0119141 | A1 | 5/2009 | McCalmont | |
| 2010/0274612 | A1* | 10/2010 | Walker | ............. G05B 19/41865 |
| | | | | 700/297 |
| 2013/0290200 | A1* | 10/2013 | Singhal | ............. G06Q 10/0637 |
| | | | | 705/317 |
| 2014/0019471 | A1* | 1/2014 | Linton | ................. G05B 19/418 |
| | | | | 707/759 |
| 2014/0095353 | A1* | 4/2014 | Psota | ................... G06Q 10/083 |
| | | | | 705/26.1 |
| 2017/0330197 | A1* | 11/2017 | DiMaggio | ............ G06Q 30/018 |
| 2020/0273046 | A1* | 8/2020 | Biswas | ............... G06Q 10/0635 |

OTHER PUBLICATIONS

"Predict Fact Sheet", U.S. Food and Drug Administration, Division of Import Operations & Policy, Imports Fact Sheet #1, Jul. 27, 2012.
"PREDICT for Imports", https://www.fda.gov/industry/import-program-food-and-drug-administration-fda/predict-imports, Jan. 16, 2020.
"Predictive Risk-based Evaluation for Dynamic Import Compliance Targeting (PREDICT)", Updated Feb. 2014, Food and Drug Administration, 2014.

* cited by examiner

FIG. 8

COMPLIANCE PROFILE SUMMARY DASHBOARD

× | ○ BOT ADMIN | ⊟ MONITOR ADMIN | ⊕ EXTERNAL DATA ADMIN | ⇧ LIMITED ACCESS INFO | ⊟ TRANS RECORDS

LAYOUT ● PAGE SIZE [100 ▼] SORT BY [TOTAL SCORE DESCENDING]

| CID NUMBER | PROVIDER NAME | % SCORE | COUNTRY | PRODUCT GROUPS | PRODUCTS | UPDATED |
|---|---|---|---|---|---|---|
| 30183 | COMPANY 76 | 65 | GERMANY | FOOD | CHOCLATE CANDY BAR WITH NUTS AND FRUIT, CHOCLATE CANDY | 10/8/2019 8:45 AM |
| 172424 | COMPANY 28 | 89 | POLAND | FOOD, SUPPLEMENTS | TEA, GREEN, TEA, WHITE, TEA, BLACK, TEA, MINT (TEA | 11/1/2019 9:30 AM |
| 244065 | COMPANY 5 | 57 | INDIA | FOOD | CHANA DAL CUCUMBERS (FRUIT USED AS VEGETABLES), WITH SUACE | 10/28/2019 11:56 AM |
| 265402 | COMPANY 1103 | 90 | INDIA | FOOD | JALAPENO PEPPER, HOT (FRUIT USED AS VEGETABLE), CUCUMBER | 10/28/2019 12:01 PM |
| 278348 | COMPANY 92 | 87 | THAILAND | COSMETICS, FOOD CONTACT SUBSTANCES, SUPPLEMENTS | FRUIT BEVERAGE BASES, LIQUID, N.E.C. BEVERAGE BASE NOT | 10/30/2019 4:32 PM |
| 308636 | COMPANY 421 | 64 | INDIA | FOOD | CUCUMBERS (FRUIT USED AS VEGETABLE), CUCUMBERS, WITH | 10/28/2019 11:56 AM |
| 340871 | COMPANY 310 | 92 | CHINA | FOOD | GARLIC, NATURAL EXTRACT OF FLAVOR (SPICE), GARLIC GROUND | 10/7/2019 7:45 PM |

☆ COMPLIANCE PROFILE
OVERALL RISK SCORE ①

SEARCH QUERY
CID NUMBER ◆
RA NUMBER
PROVIDER NAME
SCORE GREATER THAN [ALL ▼]
SCORE LESS THAN [ALL ▼]
PROVIDER COUNTRY [ALL ▼]
PRODUCT CODE
PRODUCT NAME LIKE
PRODUCT GROUPS
ANIMAL FEED
ANTIBIOTICS
BIOLOGICS

*FIG. 9*

```
PROVIDER COMPLIANCE PROFILE COMPONENT SCORE DETAIL
    ⊖ {,
        "PROVIDER_NAME": COMPANY 76
        "PROVIDER_COUNTRY": "GR",
        "CD_NUMBER": 30993,
        "RA_NUMBERS":    ⊕ [5 ITEMS],
        "PRDCT_CODE":    ⊕ [34 ITEMS],
        "PRDCT_GROUPS": ⊖ [
            "FOOD",
            "FOOD CONTACT SUBTANCES"
        ],
        "PRDCT_CODE_DESC_TEXTS":  ⊖ [
            "OLIVES, GREEN, (PIT FRUIT)",
            "OLIVE OIL, REFINED, SINGLE INGREDIENT",
            "OLIVES, BLACK, (PIT FRUIT)",
            "NECTARINE (PIT FRUIT)",
            "PLATES, ANY SIZE (FOODWARE, COOKWARE & TABLEWARE)",
            "VIRGIN OLIVE OIL, CRUDE",
            "BOTTLE AND JARS (WITH OR WITHOUT LIDS)",
        ],
        "RISK_FACTOR_WEIGHTS": ⊕ [5 ITEMS],
        "PROVIDER_PROFILE_PRODUCT_RISK_SCORES" : ⊕ [34 ITEMS]
        "PROVIDER_OVERALL_RISK_FACTOR_SCORES": ⊖ [
            "PLUS_TRANSACTION_COUNT" : 979,
            "PLUS_TRANSACTION_SCORE" : 229,
            "NEG_TRANSACTION_COUNT" : 1,
            "NEG_TRANSACTION_SCORE" : -1,
            "COMPLIANCE_ACTION_COUNT" : 1,
            "COMPLIANCE_ACTION_SCORE" : -62,
            "COMPLIANCE_LETTER_COUNT" : 0,
            "COMPLIANCE_LETTER_SCORE" : 0,
            "MOVEMENT_ALERT_COUNT" : 2,
            "MOVEMENT_ALERT_SCORE" : -175,
            "RECALL_COUNT" : 0,
            "RECALL_SCORE" : 0
        ],
        "PROVIDER_COMPOSITE_OVERALL_RISK_SCORE": 491,
        "PROVIDER_PROFILE_OVERALL_RISK_SCORE" : 65,
        "LAST UPDATED": 1570557185767
```

*FIG. 10*

SYSTEMS AND METHODS FOR ANALYZING PRODUCT MOVEMENT INFORMATION AND GENERATING COMPLIANCE PROFILES

This application is also related to co-pending U.S. patent application Ser. No. 17/546,117 filed on Dec. 9, 2021, entitled "SYSTEMS AND METHODS FOR ANALYZING PRODUCT MOVEMENT INFORMATION AND GENERATING COMPLIANCE PROFILES," which is by Thomas E. Fass and Jonathan R. Rhodes, and expressly incorporated by reference herein, in its entirety, for all purposes.

BACKGROUND

Many large companies and small businesses, such as chain and stand-alone grocery stores, retail stores and outlets, as well as online and brick and mortar dealers, rely on having inventory on hand as the life blood of their respective businesses. With an ever-increasing global economy, consumers having an awareness of products made in countries or states other than their own, or otherwise a far distance away, have come to demand, and been provided with, access to such products. Accordingly, businesses like those mentioned above, in order to compete and remain profitable, must obtain inventory such as food from Colombia, medical devices from China, pharmaceuticals from Vermont, electronics from Maine, drinks from Mexico, cosmetics from Italy, etc. With that comes an almost equal reliance on the service providers these businesses use to have products produced and transported from a point of origin to their warehouses and stores.

Importing products, or having a source of goods on the other side of a country as large as the United States (U.S.), poses many risks for inventory reliant businesses. Not only are correct quantities and expected product quality/integrity far from guaranteed, the service provider, nature of a product, and modes and routes for transport can put in doubt whether ordered inventory is even received at all. For example, a grocery chain may use a shipping company to ship containers full of the chain's nation-wide inventory of packaged coconut water from Panama to the country of the grocery store chain. Every time the shipping company comes to a port in that country and offloads the containers full of coconut water, the containers may or may not be examined by a government or regulatory agency. Examination may be initiated based on the type of product, issues with the producer or manufacturer or the shipping company in the past, issues occurring in transit, or other products in other containers on the ship having a propensity to cross-contaminate products in adjacent or nearby containers. In some cases, circumstances and history surrounding the type of product, the country the product came from, or who the buyer, seller, manufacturer, or international shipper is, could be determinative of whether a compliance event occurs when those containers are onloaded onto a ship or airplane, offloaded from the ship or airplane, and/or transported via truck or rail to a single or multiple destinations.

Types of compliance events, ones that may be tracked, can differ from country to country. In some countries compliance events can involve: issuing of a letter from a regulatory agency serving as a warning; inspections being conducted infrequently, frequently, or even every time a certain product is offloaded from a truck or ship, or a certain provider is used for shipping, or a certain provider is used to manufacture or produce a product; alerts being issued so that different divisions of a regulatory agency take the same action when a particular product enters that division's jurisdiction; products being refused upon arrival at a port or intermediate node of a supply chain; or a recall of products. The occurrence of any type of compliance event can delay, or all together eliminate, the delivery of significant portions of a business's most valued asset—its inventory.

Different countries can employ different systems, promulgate different rules, have one or more regulatory and/or private agencies that enforce those rules (differently in some cases), different penalties for violations, and various ways to assess the severity of violations. In addition, some countries may track each type of a designated compliance event with a different system. Tapping into these disparate systems for information about providers subject to compliance events can be further complicated by the fact that the providers being monitored may not be referred to in the same way in each system. Different facilities for the same provider may be listed as different providers, some systems may employ one type of registry while other systems may recognize an identifier attached to a certification that not all facilities of a provider are required to have, or each has its own.

For example, in the U.S., companies that want to import products from another country often must register with the Food and Drug Administration ("FDA"). Manufacturers (that, for the purposes of the present disclosure, are considered one type of provider of product movement services) in other countries where the above companies obtain their products from, may also have to be registered with the FDA. However, the provider can have multiple facilities, and each facility may have its own registration with the FDA. When products arrive to the U.S., these imports may be inspected for some of the reasons discussed above, or also for markings to prevent counterfeit goods, or goods that infringe U.S. patents or trademarks from entering the U.S. market. As a result, these products may be seized or held up, and a business having no knowledge of a manufacturer or shipping company's practices, may never see those products or recoup the cost paid to get the products to the point where they were seized.

Staying with the FDA as an example, the agency tracks different types of compliance events with different databases, and can issue notifications for each type of compliance event through a respective channel of communication. More specifically, the FDA's Import Alert, Import Refusal, Enforcement Action, Inspection Classification, and Warning Letter Databases are accessible through each's own website, and are akin to independent event silos of information. In addition, not each of these databases catalogue providers' respective activities according to a facility FDA Establishment Identifier (FEI). Even with this identifier, it is not uncommon for one facility, even though operated by a single company, to have multiple FEIs. Multiple facilities or divisions of a provider not being grouped with that provider is also an issue.

Thus, it is both time consuming and potentially unworkable for businesses or U.S. registrants to use the FDA's "silos" of information to determine whether they should start or continue to use particular providers. There is currently no system that would enable a business to view, obtain, and store information regarding all of the compliance events, of each compliance event type, that even one, let alone all, of their providers may have been involved with. On a more fundamental level, even if this combination of information could be obtained (which currently it cannot be), there is currently no system that would enable a business to enter their providers into some type of interface or repository for the purposes of doing any of (a) regularly receiving automatic pushes, (b) continuous tracking, or (c) one-time aggregations—of storable current and historical information records of transactions and/or events. This is especially the case for compliance events occurring over a substantial period of time, such as 3 years, or even as recently as within the last 30 days. This also inhibits a party's ability to assess the potential for a compliance event to occur if the party employs the provider to manufacture, transport, or otherwise provide a product movement related service.

As a result, a need exists for systems and methods capable of analyzing product movement information from multiple independently formatted/configured sources, and associate a provider with all the compliance events that involve that provider directly, or the provider's facilities, or the provider's subsidiaries, close affiliates, etc. In addition, a need exists for systems and methods that can provide a comprehensive picture of a provider's ability, historically, to perform its respective services in a manner that is compliant with one or more regulatory regimes (which logically can be used as an indication of the potential for the provider to be subject to compliance events in the future).

SUMMARY

Examples described herein include systems and methods for analyzing product movement information and generating compliance profiles. A system according to the present disclosure can include one or more servers that implement one or more services that are configured to communicate and aggregate information from various external sources of information regarding product movements.

Product movements include any manufacturing or production by any means, or transport by any mode of transportation, of one or more products for which a record can be generated. Thus, product movements include any development, manufacture, processing, packaging, labeling, production (e.g., growing), importation, exportation, transport, onloading, offloading, storage, distribution, or retail selling: produce; commercial, perishable, or raw food, beverage, or supplement products; medical devices; drugs; cosmetics; electronic devices; subcomponents of electronic devices; tobacco products; biologics or biologic material; heavy machinery; any product that is imported into or exported out of any country by any means; or any products transported in bulk within any country. Accordingly, shipments of containers, and transports of products in bulk by land, sea, air, express carrier, mail, or carried into a country, such as the U.S., by travelers from any point of origin to any destination, are considered product movements for the purposes of the present disclosure. Further, acts of onloading and offloading containers or lots of products, from a point of origin or one mode of transport, to another mode of transport or a final destination, are considered product movements.

In one example, the plurality of external information sources may include records of product movements reported according to respective formats encompassing different categories or data fields, or even different ways of reporting the same data element such as a date or an address of providers of product movement related services. In another example, once product movement information is aggregated, a system of the present disclosure converts the product information into provider transactions by identifying providers within the product movement information across any and all formats. Provider transactions may be grouped together according a provider identified for the transactions, and stored in a memory, database, or other type of electronic repository. A provider transaction may therefore include a provider of a product movement service, a type of product movement service provided, and location or location(s) where the service was provided.

Product movement information, depending on the external source, may include just those records of product movements (A) for which a compliance event or other issue did not occur, or (B) that involved a compliance event. With respect to (B), some external sources may even be specific to certain types of compliance events. A compliance event can include: an inspection of any lot of products; a letter issued by a regulatory agency or a generally recognized authority in any country regarding a product movement; an alert issued by a regulatory agency or a recognized authority regarding a certain product of a provider; detainments or seizures of products; a refusal of products at a port, weigh station, transfer point, or destination; or a recall of products by a manufacturer, government, regulatory agency, or recognized authority in any country. External sources of this type of product movement information can include databases maintained by governments, organizations, or private companies that are responsible for regulating or reporting on the regulation of product movements at transfers points, ports of entry, borders between countries or states, and the like.

A system according to the present disclosure may implement a service through a server or other computing device that is configured to assign unique controlling identifiers to providers based on parsing and analyzing the provider transactions. In addition, the system can identify compliance events included in the provider transactions, and associate those compliance events with respective controlling identifiers for the providers involved in the compliance events. Based on compliance events and final dispositions of provider transactions associated with a provider, risk factor scores may be generated for the provider and associated with the provider's controlling identifier. The risk factor scores can be generated by applying a scoring system to the provider's transactions and compliance events.

In one example, a set of risk factor scores can be determined for a provider's overall activity. In addition, a set of risk factor scores can be separately determined for each product the provider deals with. These risk factor scores may be components of a provider's respective compliance profile, and used to determine other components, such as an overall compliance score, for the provider. In one example, a compliance profile can include an overall compliance risk score for a provider, and individual product compliance risk scores for each product the provider deals with. Each compliance risk score indicates the provider's track record, and potential ability, for complying with various laws and regulations, which in turn can be viewed as an indicator of the provider's ability to avoid damage to, delays in delivery of, or confiscations of products in the course of providing its respective product movement services.

In another example according to the present disclosure, compliance profiles can be requested and presented through a graphical user interface. Accordingly, an individual or entity can request and view a compliance profile for a provider it does business with, or is considering doing business. As a result, the individual or entity can make a decision that is based on accurate information regarding a particular provider's past performances. In effect, the individual or entity would have the option, prior to making that decision, to use that accurate information to inform their own estimation of the likelihood or probability that its products will reach a desired destination, at an expected time, and in an expected condition, if the particular provider is used for one or more required product movement services. Further, a system of the present disclosure would significantly improve their ability to verify if that particular provider was compliant with the rules and the laws the provider was required to comply with. In some countries, such as the U.S., individuals and entities may be required by law or regulation, such as the Foreign Supplier Verification Program ("FSVP"), to provide assurances, and in some cases evidence, that their providers are in compliance with recognized product movement procedures that provide at least a certain level of (health, safety, environmental) protection that have been recognized by a country, governmental body, regulatory body, or private concern having itself been recognized to some acceptable degree.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

BRIEF DESCRIPTION OF THE DRAWINGS

FIG. 8 is an illustration of an exemplary GUI that presents, to an administrator, searchable transaction records grouped according to providers involved in the transactions.

FIG. 9 is an illustration of an exemplary GUI that presents, to an administrator, compliance profile summaries for selected providers, and includes selectable options for accessing detailed score information for different components of a compliance profile.

FIG. 10 is an illustration of an exemplary GUI for enabling an administrator to review detailed score information for profile components and modify algorithmic components used for score determinations.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Figure 1:
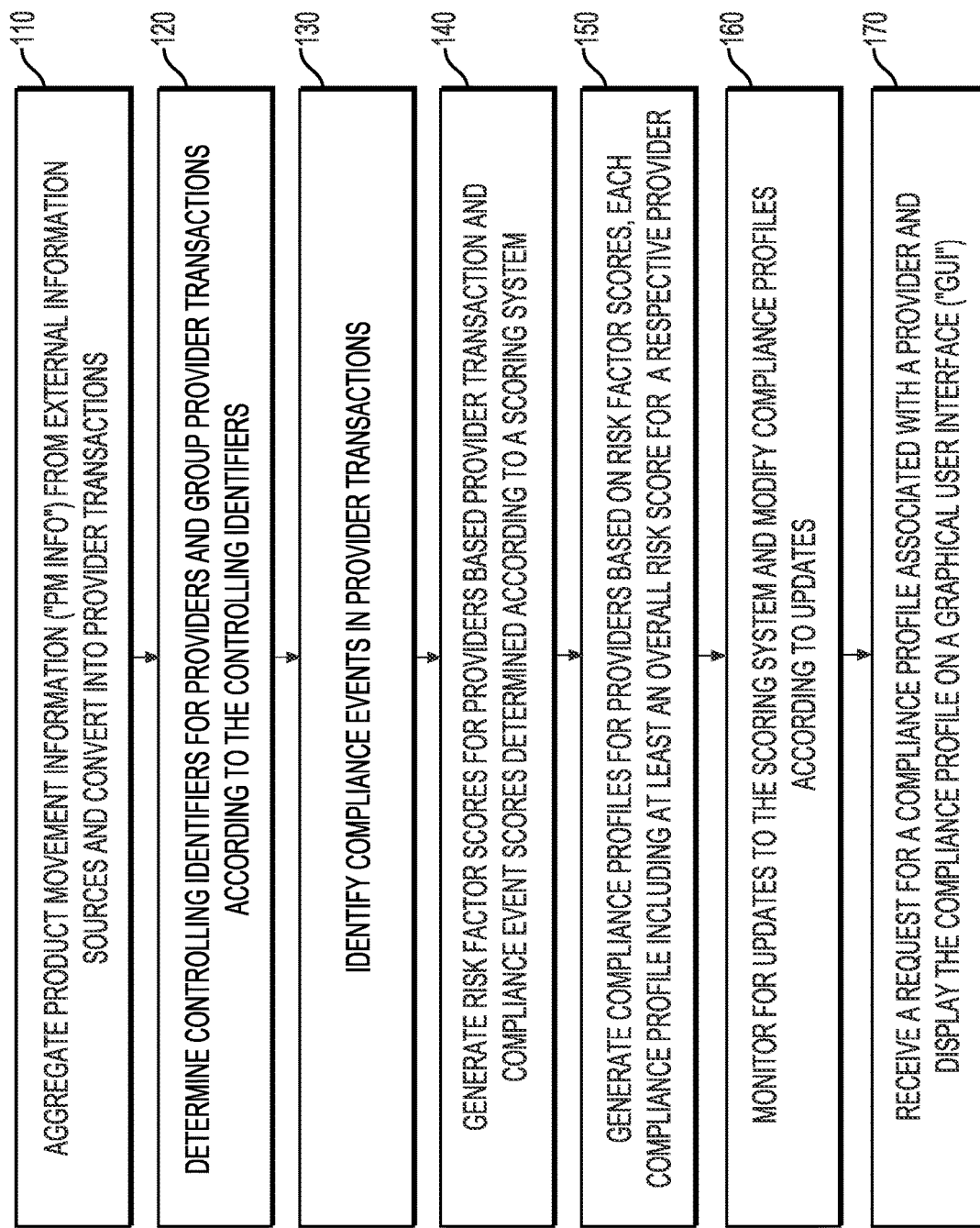
FIG. 1 is a flowchart of an example method for analyzing product movement information and generating compliance profiles for providers of product movement related services.

FIG. 1 is a flowchart of an example method for analyzing product movement information ("PM info") and generating compliance profiles for providers of product movement related services as previously defined.

At stage 110, product movement information ("PM info") from several external information sources, can be aggregated using one or more servers. The external information sources can include databases that are maintained by governments, regulatory agencies, or privately-owned organizations that track product movements on an international basis. In addition, the PM info can be converted in stage 110 into provider transactions according to the products and providers of product movement related services recited or otherwise reported on in the PM info received.

In stage 120, controlling identifiers ("CIDs" or "CID") can be assigned to providers identified in the provider transaction. It is often the case that multiple sources of PM info within a regulatory regime, do not share, nor do they store, standardized information with respect to providers. In one example, various providers may have multiple facilities, multiple subsidiaries, or international divisions, each having its own name or variation of a name most commonly associated with the provider.

An example where the above issue often arises is with the previously mentioned FDA and the at least five (5) databases it maintains. PM info may be retrieved, and in turn used to monitor aspects of provider transactions in the U.S. and in other countries, but to do so requires great amounts of time and effort, while persevering through significant waves of frustration. A provider's FEI number may be provided in one database but not another. Subsidiaries of a provider could have different names in different databases. Parent and child companies for a provider may not be linked or otherwise have a relationship with the provider represented in one or all of the databases. In addition, the provider in question, as well as the parent or child company, may all be listed as providers, each having its own registration or designated identifier of some type. Further, each of these entities may have a recognized identifier of a type that is different from the type of identifier of the other two entities (e.g., two entities may have the same tax ID, whereas the other entity does not have same tax ID and is the only one of the three to have an FDA registration number).

Once PM info is converted into provider transactions in stage 110, a system according to the present disclosure can mine the transactions for providers that have already been assigned a CID. In addition, processing of other providers included in the PM info, now listed in one or more transactions but without CIDs, can include cross-referencing these providers with a listed of previously "CIDed" providers. In one example, a management service can perform the cross-referencing by reviewing provider names, addresses, tax IDs, products and countries dealt with, and any other category of data may be identifiable from the PM info prior to conversion.

In one example, a management service according to the present disclosure can be implemented by a management or admin server that is an internal component of a computing infrastructure that generally defines an admin platform. Further, the management service can be an internal software-based tool implemented on the admin server to manage the server's operations and its associated tools. In another example, the management service can be a tool used by administrative entities for an infrastructure to directly manage and control the admin server (either onsite or remotely).

As used herein, an admin platform may generally refer to a computing infrastructure that serves to facilitate transfer, conversion, transformation, derivation, and/or delivery of PM info to or on various computing devices for an enterprise (admin/management servers and administrator utilized user devices ("admin devices")), in order to provide various services based on the PM info to user devices of end users/service subscribers ("end user devices"). Provision of these services can be initiated, managed, or otherwise caused by the management service employing other tools including but not limited to an application programing interface ("API"), web application, website, stand-alone application, and the like.

The management service can determine that a new CID needs to be assigned, or transmit a CID recommendation through an admin platform to an interface operated or otherwise monitored by administrators using an admin device. The admin device may include any computing device. In one example, the recommendation can include a message that a certain previously assigned CID should be assigned to a provider in question. In another example, included with the recommendation can be a confidence score generated by the management service that rates the likelihood of the recommendation being correct. In other examples, the recommendation can include a message that a new CID should be assigned to the provider in question.

At stage 130, a management service can identify compliance events for individual transactions represented in the product movement information. In one example, a similar information mining procedure used to identify providers in order to define provider transactions, can be performed on the provider transactions to identify the compliance events. In stage 140, with the compliance events identified, risk factor scores can be determined for providers based on the nature of the compliance events and their respective roles in the compliance events. At stage 150, compliance profiles for providers reported on in PM info can be determined from their respective risk factor scores. Generating a compliance profile for each provider includes determining at least an overall risk score for the provider and including the overall risk score as a component of the compliance profile. In other examples, compliance profiles can also include product risk scores for each product the provider deals with, as determined from transaction scores and compliance event scores for provider transactions involving the product respectively.

In stage 160, external sources that maintain scoring systems can be monitored. These sources may include government, industry-regulating, industry-rating, or commercial entities whose policies are adhered to, certifications sought after, or whose authority is otherwise recognized by providers and end user/subscribers. These recognized entities may, from time to time, change weighted values for different types of compliance events which are considered for determining risk factors, or how different risk factors should be weighted or otherwise used (e.g., in a formula) for determining overall and product risk scores. Changes may be published and generally available, or provided as part of a subscription service. In one example, the scoring system used by the management service can be modified in whole or in part, based on the updates to one or more weighting schemes implemented in the scoring system, as determined in the course of monitoring these entities in stage 160. These schemes, or individual components/coefficients of the schemes or the scoring system may be maintained by one or more recognized entities.

In other examples, the management service can be configured to modify a weighting scheme it implements according to predetermined rules. These rules can be used by one or more computing devices to process and change the weighting scheme on account of statistics, situations having an industry wide effect, or periodic practices by governing or regulatory agencies. For example, rules relating to cross-contamination can be triggered by the management service processing statistical information regarding an out-break of *E. coli* in spinach from country X. This cross-contamination rule, once triggered, may direct the management service to another information provider that reports on products commonly exported from country X, and a frequency with which any of those products are exported together with spinach over a predetermined period. In such an example, an overall risk score for providers from country X may get a minimum increase or decrease (depending on scale), or a variable increase or decrease depending on what those providers typically export.

At stage 170, a request for a compliance profile associated with one or more providers can be received through a GUI presented on an admin or end user device. The request can be transmitted to the management service. In turn the management service can retrieve a compliance profile for each of the providers requested, from an internal storage of an admin server, and/or a database used for PM info conversion and provider transaction storage. In addition, the compliance profile may be received and presented through a GUI that is being implemented on a computing device in stage 170.

In one example, stage 170 can include an API being implemented in concert with the GUI to present the compliance profile. The API could be implemented, as part of the operations of the management service, by a cloud service so as to: (1) receive input specific to the API, including function calls, from servers and/or computing devices of the admin platform and/or end user devices; (2) implement the API to generate output based on the API-specific input; and (3) push the output to the servers, admin computing devices, and/or end user devices. In particular, the API output could be pushed to an Admin or an end user GUI through which the API specific input, such as an API function call, was provided. In one specific illustrative example, a process can include an administrator selecting an option in an Admin GUI, or a subscriber selecting an option in an end user GUI. Such a selection may result in an operation being executed or code being run on a client-side basis, which causes one or more API functions to be called for execution on a cloud service basis (e.g., via code running in a cloud). The execution of the operation being facilitated, or the code being maintained according to instructions issued, by the management service, in one example.

In another example, the API can be installed and maintained on the computing device by or through the admin platform. In such an example, installation of the API on a client device, such as an admin or end user device, could provide additional functionality for administrators and end users alike. Installation, as referred to in this paragraph, may involve integrating the system of the present disclosure with an external system run by an entity providing admin platform related services, or even with a system of an end user (upon authorization being granted through an admin platform). In this example, options provided in the GUIs described herein could include an option that allows an admin services provider, or an end user to: request the creation and scoring of one or more new risk factors; or (b) build their own scored risk factors, and request ongoing support for those risk factors. In this example, a request from the admin services provider may be forwarded to a cloud service or a third party that configures and provides support for an admin platform the third party has integrated into the admin service provider's computing infrastructure. In either the case of an admin services provider or an end user, specific data from those parties' external (with respect to the admin platform or end user GUI) systems could provide the basis for score generation according to an operation that those parties develop or request development of, and is run by the API.

With any of the system designs discussed herein, an API or other software-based tool can be implemented (locally, remotely through an internal network, or via a cloud service) to generate or otherwise result in the display of compliance profile(s) in one or more types of GUIs. In one example, the request can be received from a computing device being used by an end user that subscribes to a service provided by a computing infrastructure that makes up the admin platform. In another example, the request can be received from a computing device that is part of the admin platform and utilized by an administrator to ensure: information integrity; correct server, API, website, and/or application operation; and suitable maintenance and support is delivered to the end user.

Figure 2A:
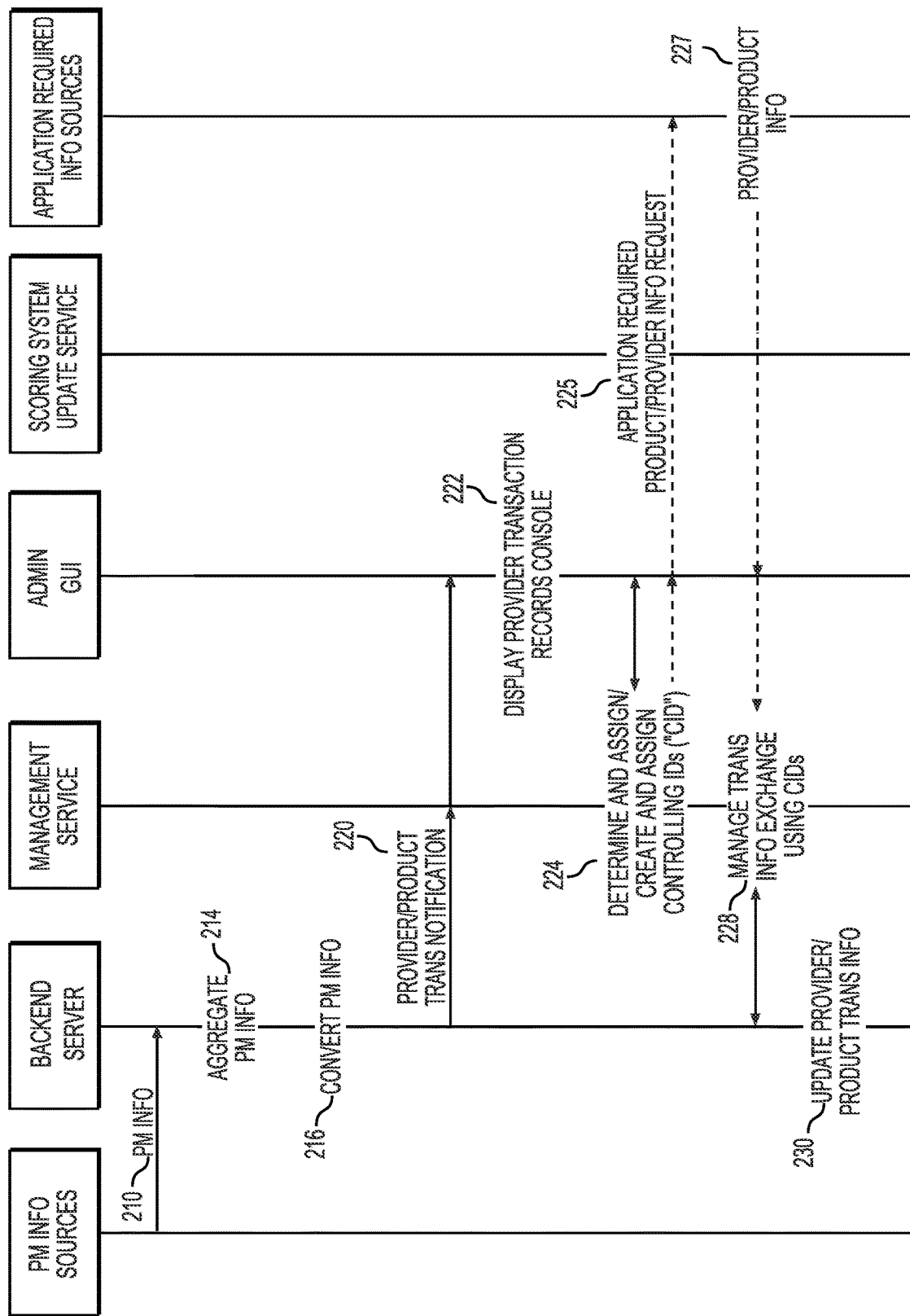
FIG. 2A is a sequence diagram of an example method for converting product movement information into provider transactions and assigning controlling identifiers to the transactions.
Figure 2B:
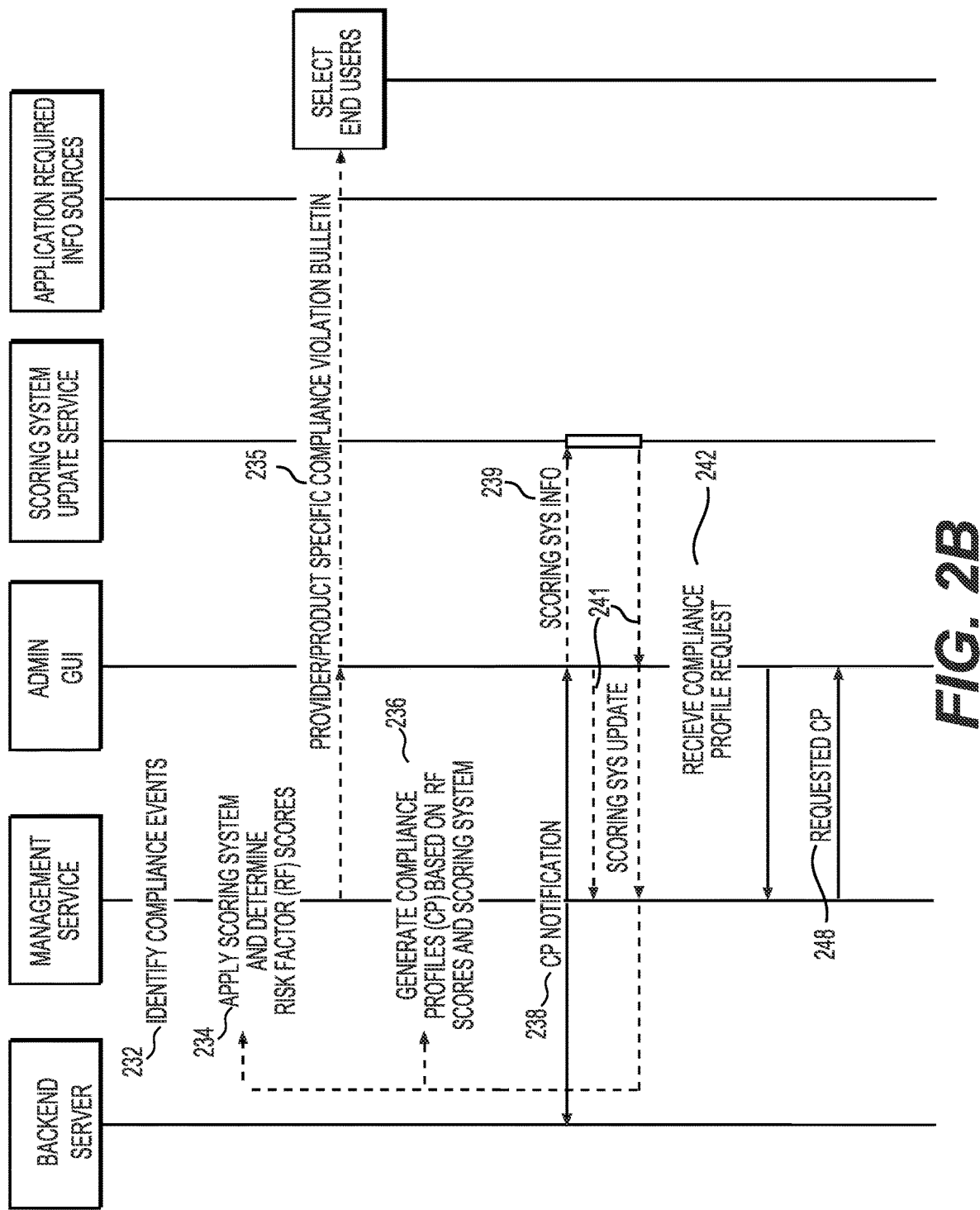
FIG. 2B is a sequence diagram of an example method for applying a scoring system to provider transactions and compliance events identified therein and generating compliance profiles.

FIGS. 2A and 2B, together, illustrate a sequence diagram of an example method for converting product movement information and generating compliance profiles specific to providers. FIG. 2A, in particular, illustrates a portion of the exemplary method that includes converting product information into transaction information associated with providers, and determining and assigning CIDs to provider transactions or providers.

At stage 210 a backend server can receive product movement information from several external information sources. In one example, the information sources can include databases maintained by public or private regulatory agencies.

At stage 214, the product movement information can be aggregated by the backend server and stored in a conversion database. In other examples, the conversion database can exist on a server that is managed by a management service and one or more administrators, and/or admin devices.

In stage 216, a conversion service implemented by the backend server can convert the product information into provider transactions in the conversion database. The conversion service can be an internal software-based tool implemented on the backend server to be managed by a management service that manages the server's operations and its associated tools. In another example, the conversion service can be provided by a management service for the backend server. In one example conversion is accomplished by the conversion service parsing through the product information using various data processing methods to identify different providers and group portions of the product information associated with the providers together. In one such example, identifying providers can include identifying provider names, addresses, identification numbers, certifications, products frequently dealt with, and movement services provided. Once grouped, the conversion service can review grouped information for each identified provider, and identify transactions for which the provider performed a movement related service or was otherwise involved in.

In another example, identifying products can include identifying, within the product movement information, product names, product codes (e.g., FDA product codes), product classifications, product types, provider names associated with given products, modes of transport, countries of origin or frequent destination, identification numbers, certifications, products frequently moved in combination with, handling requirements, and the like.

In another example, conversion in stage 216 can include assigning portions of the product information associated with providers that are already cataloged in the conversion database because they have already been assigned a CID. The CIDs may be independently generated or derived from the PM info by the management service in stage 224 described in more detail below. However, previously determined CIDs can be stored by the backend server in the conversion database, and referenced when PM info is converted into provider transactions.

In one example, the CID may be assigned to a given provider by the conversion service because the provider is identified a threshold number of times, and from one or more select information sources not included in the product movement information. These portions of the product information define the provider transactions stored in the conversion database for respective previously identified providers.

In yet another example, the conversion service can review the parsed information for providers that have not been issued, or for which cannot be identified, a CID.

At stage 220, the backend server can notify a management service implemented on an admin server, that new transactions have been added to the conversion database. In another example, the backend server operation in stage 220 can be in response to an inquiry from a component of an admin platform other than the admin server. For example, an administrator using an admin device may request the latest transactions.

The management service can forward on the transactions to an Admin GUI that displays the transactions as records in a dashboard or console in stage 222.

In stage 224, the management service can initiate an exchange of transaction information with the Admin GUI that results in CIDs being determined or created, and assigned to various providers that remain without a CID. This can include the management service reviewing the provider transactions presented by the backend server, and determining that one or more transactions are associated with an incorrect CID.

In another example, a package of information that defines a transaction can lack a CID, and the management service may be unable to assign an existing or a new CID to a provider involved with that transaction. The management service can transmit a notification to the Admin GUI that includes information for the transaction and prompts an administrator to assign an existing, or create and assign a new CID to the provider associated with the transaction.

In another example, a transaction may be product order centric and be defined as a set of transaction records that establish a series of product movements and collectively define a supply chain with respect to a particular lot of products. The management service can instruct the Admin GUI to prompt an administrator to assign or create a CID for one or more providers associated with one or more product movements (transactions) that make up the product order centric transaction. In response, the management service may be provided with a CID for the transaction(s) in question. As will be explained in more detail, this information may be processed in stage 228 so that the backend server is updated with the CID.

In other examples, a package of information that defines a transaction can lack a CID, a discernable or legitimate name for a provider, or any other piece of information that renders both the management service and an administrator operating the Admin GUI unable to assign an existing or a new CID to a provider involved with that transaction. The management service may determine that a controlling identifier cannot be assigned or created for the transaction because a provider cannot be identified. The management service can come to this determination after prompting an administrator, through the Admin GUI, to provide a CID and not receiving a response. In other examples, the management service may receive a response that indicates the administrator does not have sufficient information to assign or create and assign a CID. As a result, either the administrator, through the Admin GUI, or the management service can independently (but conditionally) initiate performance of an optional information request process at stage 225.

In stage 225, as noted above, the management service, or an administrator through the Admin GUI, can request information from one or more sources that require the submission of an application requesting information related to a transaction. In one example, the application-required information request can be in the form of a request for documents or other information conveying means that conforms to a particular format and claims priority to the information under: (A) a law of a country, state, region, municipality, district, or other type of jurisdiction; or (B) a regulation of a state (e.g., country) sponsored agency or recognized private organization or authority; or (C) a rule that is established by a recognized body and may apply to any type of information from any industry, or specifically relate to transactions involving product movements (including manufacturing). In one example, an application may be submitted that complies with the Freedom of Information Act ("FOIA") established under the federal laws of the United States.

In stage 228, the management service coordinates the exchanges of transaction information between it and the backend server, the Admin GUI, and in some cases, the application requiring information sources. More specifically, the management service can function as the controlling authority within an administration platform for CIDs. In some examples, a CID for a provider can be added through the Admin GUI. This can result from an independent determination made by an administrator, or a decision aided by the results of stage 225, if performed. In this situation, the management service can function to update provider CIDs in an internal storage and the records stored in the conversion database for the backend server.

In other examples, the management service may determine a CID by comparing aspects of a transaction or a provider with other records, or in response to receiving provider or product information as a result of stage 225. In the event of either, the management service is tasked with updating the conversion database through communication with the backend server. In addition, the management service may update, in real-time, any affected records currently being displayed on the Admin GUI. In still another example, the management service may issue a notification to the Admin GUI that is displayed in a graphic separate from the Admin GUI, and includes the CID, provider, and transaction information relevant to the update.

At stage 227, the management service, or the management service and an administrator utilizing the Admin GUI, may receive provider or product information related to the inquired-about transaction in question, from an information source requiring an application for such information.

Whether or not any product or provider information is transmitted from the management service, the Admin GUI, or another source in stage 228 or optional stages 225 and 227, the conversion database is updated by the backend server in stage 230. Where information is provided, the transactions that the transmitted information concerns will be updated in the conversion database in stage 230. In contrast, where transaction modifying information is not transmitted, the backend server can update a log maintained in the conversion database. An entry identifying the transactions presented, and reflecting that these transactions remained unchanged can be logged. In turn, this log can be used in the future as a reference when the conversion service is converting a new instance of a product movement information package. In other examples, this log, or a separate log, can be updated with transaction information as more information becomes available, and used as reference for the conversion service. This may increase the conversion service's ability to avoid repeating the same incorrect associations between transactions and providers/products in the future.

FIG. 2B is a sequence diagram of an example method for applying a scoring system to provider transactions and compliance events identified therein and generating compliance profiles. At stage 232, compliance events can be identified by the management service in a similar process for which providers are identified from PM info with respect to different provider transaction.

In another example, at least the identification of compliance events can be performed at the backend, and stored in the conversion database by way of assigning a particular designation or definition to portions of a transaction stored in the conversion database.

In stage 234, point values can be assigned to compliance events and final dispositions of provider transactions for each provider according to a scoring system implemented by a management service. The scoring system can specify different point values for each type of compliance event. An example of a point value structure for an exemplary scoring system is provided in Table 1 below.

TABLE 1

Exemplary Scoring System - Exemplary Compliance Event Point Values

| Compliance Event Type | Event Sub-Type | Point Value (multiples of X*) |
|---|---|---|
| Refusals/Releases (e.g., refusal or release of products at transport transfer points such as ports, freight stations, airports, weigh stations, etc.) | Seizure | −10.0 |
| | Refusal Inform Before Export | −7.0(Y)** |
| | Refusal Inform After Export | −7.0(Y) |
| | Reconditioned Materials Released | −6.0 |
| | Detained | −3.0(Z)*** |
| | Released w/ Comment after Detained | −5.5(Z) |
| | Released w/o Comment after Detained | −4.3(Z) |
| | Released w/ Comment | −5.75 |
| | Released w/o incident | 0.5 |
| | Released and inbound | 5.0 |
| | Released with Transfer | 7.5 |

TABLE 1-continued

Exemplary Scoring System -
Exemplary Compliance Event Point Values

| Compliance Event Type | Event Sub-Type | Point Value (multiples of X*) |
|---|---|---|
| | Point Certification Released with Reg. Agency Certification (e.g. OASIS MPRO) | 10.5 |
| Compliance Actions (e.g., Inspections at points of origin, final destinations, and transfer points) | No Action | −7.8 |
| | Contested Action | −6.2 |
| | Voluntary Action | −3.5 |
| | Official Action | 5.0 |
| Compliance Alerts (generic terms used here to reflect that alert classifications can differ by jurisdiction) | Code 1 (e.g., Green for FDA) | −0.5 |
| | Code 2 (e.g., Yellow for FDA) | −2.5 |
| | Code 3 | −5.5 |
| | Code 4 (e.g., Red for FDA) | −8.0 |
| Compliance Letters | Preliminary Warning | −0.5 |
| | Warning w/ set closeout date | −2.0 |
| | Warning w/ closeout date pending next PM | −4.0 |
| | Warning w/o closeout date | −7.0 |
| Recalls | Class I - Mandatory | −8.0 |
| | Class II - Mandatory | −5.0 |
| | Class III - Mandatory | −3.0 |
| | Class I - Voluntary | −3.0 |
| | Class II - Voluntary | −2.0 |
| | Class III - Voluntary | −1.0 |

*X = Multiplier that can vary according to jurisdiction where a compliance event occurs and can reflect an estimated impact on a provider's ability to provide services in that jurisdiction based on how the jurisdiction views compliance events.
**Y = a value between 1 and 0 that reflects a percentage of the total number of units of a product refused for subject movement of that product
***Z = Number of days products were detained In one example, a compliance event involving an action (e.g., inspection), or an alert, a refusal, recall, or issuance of a letter can correspond to a status identifier as designated by an external information source for the product movement information where that compliance event is reported. The status that is assigned can be from a list that is maintained by a regulatory agency, such as the FDA. In one example, product movement information from external sources can constitute a sub-set of such a list and/or include statuses specific to the types of compliance events for which an external information source is a repository and source. In one example, several event sub-types that the management service can identify from provider transactions (carried over from product movement information) can correspond to a status or designation from a list maintained by a regulatory agency. For example, one or more sub-types can correspond to statuses made available or otherwise used by the Import Trade Auxiliary Communications System ("ITACS"), FDA/Customs Interface, or Notices of FDA Action systems. As a result, the management service can store these statuses and scan provider transactions for the same as one process for identifying compliance events and scoring them according to the scoring system.

In addition, the scoring system can determine a score for each provider transaction based on a final disposition of the transaction. In one example, the final disposition of the transaction is an indication of whether a service provided for the transaction resulted in the subject products being successfully moved, moved with a delay, were moved but by another provider not originally planned for, or not moved (e.g., were seized at a port). An example for a portion of a scoring system used to determine a point value to assign final dispositions of provider transaction is provided in Table 2 below.

TABLE 2

Exemplary Scoring System -
Exemplary Point and Multiplier Values for
Provider Transaction Final Disposition
Score = R × S + T

| Score Component | Description | Multiplier (R) | Point Value (S, T) |
|---|---|---|---|
| Product Movement Service Provided (R) | Transport - Shipping | 5.0 | — |
| | Transport - Air | 4.5 | — |
| | Transport - Trucking | 3.0 | — |
| | Transport - Rail | 2.5 | — |
| | Manufacturing/Production | 7.0 | — |
| | Onloading | 8.0 | — |
| | Offloading | 8.0 | — |
| | Agent Services | 1.0 | — |
| Number of Compliance Events Resulting from Service (S) | None | — | 10.0 |
| | 1 | — | −20.0 |
| | 2 | — | −50.0 |
| | ≥3 | — | −100.0 |
| Status of Products as Result of Service (T) | Moved | — | 100 |
| | Moved w/ Delay | — | 0 |
| | Moved by Other Provider | — | −100 |
| | Cannot be Moved | — | −200 |

Tables 1 and 2 illustrate the implementation of a weighting system at the sub-transaction (i.e., compliance event) and transaction levels for provider activity. More specifically, the different point values assigned to certain types of compliance events reflect numerical estimations of the severity of those types of events. The severity of a compliance event can impact a provider's ability to perform for a party in the future. Accordingly, the scoring system effectively estimates how an individual event may impact a provider's ability, and thus a degree to which the provider can be relied on, to provide a product movement service in the future without the products in question being subject to a compliance event.

On a transaction level, the different multiplier values attributed to different types of services may reflect the difficulty generally associated with performing the service without the occurrence of a compliance event. In another example, the different multiplier values reflect an estimate of the criticality of a service, within a respective supply chain, being performed without the occurrence of a compliance event. Thus Tables 1 and 2 reflect how a weighting system can be employed at a granular level.

In another example, a scoring system according to the present disclosure is configured to weight compliance events of the same general type relative to each other using a coefficient of recency. Simply put, if two provider transactions for one provider involve the same type of compliance event (same severity), scores for the more recent provider transaction and respective compliance event will be multiplied by a coefficient having a higher value than that of the other transaction/compliance event. In another example, other characteristics of certain types of compliance events that may have a time-related component may be factored into an individual compliance event score. For example, point values for compliance alerts may be modified up or down, by a positive or negative factor, or according to other operations based on a point with an alert lifecycle the particular compliance alert is in. Similarly, point values for recalls may be changed according to an operation that involves the recall event scores and a modifier. In one example, both the operation, and a value of the modifier may depend from which status within an alert status cycle, the alert in question has. Table 3 below provides an example of how scores for individual transactions and compliance events may be increased, decreased, or modified generally, based on a respective event status or time-related indication that may be identified in the product movement information.

TABLE 3

Exemplary Scoring System - Event Status or Lifecycle Phase Modifiers

| Modifier Description<br>(A) Applicability<br>(B) Recognized Format of Metric Values<br>(C) Metric Value Secondary Operative Use<br>(D) Modifier Value Operative Use | Range of Values for Controlling Metric | Modifier Value Corresponding to Metric Value (t, as, rs) |
|---|---|---|
| Recency Coefficient (t)<br>(A) Transaction and Certain Compliance Event Scores<br>(B) Integer - Number of Years Since Event/Transaction<br>(C) Compared w/ reference value to determine operation and/or value of additive modifier; Multiplier<br>(D) Score Multiplier | 0 (Yrs.)<br>1<br>2<br>3<br>4<br>5 | 1<br>0.8<br>0.6<br>0.4<br>0.2<br>0.1 |
| Alert Status (as)<br>(A) Compliance Alert<br>(B) Text<br>(C) Compared w/ reference value to determine add or multiply operation and/or value/sign of multiplier<br>(D) Multiplied and added to score | Active<br>Inactive | 25<br>5 |
| Recall Status (rs)<br>(A) Recalls<br>(B) Text<br>(C) Compared w/ reference values to determine operation and/or value of additive modifier<br>(D) Added to score | Ongoing<br>Completed<br>Terminated | -5<br>0<br>5 |

In one example, application of the scoring system results in provider transactions and compliance events being scored as discussed above. For each provider, negative and positive scores for their provider transactions may respectively be added or averaged to determine risk factor scores (positive and negative) for transactions. Likewise, scores for compliances events may be grouped together according to compliance event types. A risk factor score, then, may be determined for each type of compliance event, by adding or averaging all the scores for that type of compliance event. This can be done for each of the products that providers deal with. More specifically, the same score calculations can be done for just those transactions, and compliance events occurring therein, that involve one product, or one group of products, and or one type of service provided.

As illustrated in FIG. 2B, the management service can apply a first phase of the scoring system to determine risk factor scores. In another example, the risk factor scores can be determined with an API implemented by a server, or a device that supports the Admin GUI. In one example, the API can run in a browser or over an internal network between an admin server and an admin device. In one particular example, JavaScript hosted on the admin server may be run when a function of the API is called as a result of a selection of an option provided in the Admin GUI. In another example, operation of the API can be provided through JavaScript or embedded HTML code that processes data from the backend server and generates risk factor scores using algorithms in the embedded code. In another example, embedded HTML code could be employed by the Admin GUI or through another implementation to provide an administrator with options to modify aspects of the scoring system. One such option could permit an administrator to modify how risk factor scores are weighted relative to each other to determine product risk scores, or how product risk scores are weighted relative each other to determine overall risk scores.

An enterprise implementing the system that performs the exemplary method illustrated in FIG. 2 may be under obligations to notify end users having a particular relationship with the enterprise. In one example, these end users (hereafter "end users" or "subscribers") may subscribe or otherwise contract with the enterprise to receive certain services with respect to the providers the subscribers do business with. In one example, such an enterprise may serve as an agent for its subscribers in the subscribers' dealings with different types of providers and regulatory agencies. Further, the enterprise may serve as an agent and facilitator for subscribers' efforts to meet rules, laws, and/or regulations promulgated by regulatory agencies.

In some examples, a subscriber, to be compliant, must not buy, sell, transport, or otherwise deal with a provider or a product subject to, or the subject of (e.g., responsible for in the case of a provider), certain compliance events of a particular severity (referred to hereafter as a "compliance violations"). As previously discussed, a compliance event can include a compliance action or letter, or a product movement alert, refusal, or recall. A compliance violation may include any one or more of these types of events that meet a threshold of severity for that type of compliance event. Legal or contractual obligations may charge the enterprise, acting in a role of an agent or a facilitator, with a duty to notify subscribers in a situation where the enterprise knows or reasonably should know of the occurrences of such compliance violations.

Thus, an enterprise serving as an agent or facilitator may be required or otherwise obligated, under the previously mentioned rules, laws, and/or regulations, to notify a subscriber when a provider the subscriber does business with, or a product the subscriber deals with, is involved in a compliance violation. In such situations, the management service can be configured to recognize the occurrence of compliance violations in processing product and provider transactions, and compliance events, and determine which subscribers may be affected. In addition, the management service may optionally be configured to issue notifications at stage 233 in an automated manner to administrators and/or affected subscribers. The notifications can take the form of bulletins that specify which particular providers or products have been involved in a compliance violation, and the nature of the compliance violation. In one example, such violation bulletins may be transmitted through an automated process performed by the management service, to the Admin GUI, as well the select end users identified as being affected.

In another example, the management service may be configured to issue violation bulletins to administrators through the Admin GUI, who then review the violation bulletins to verify they don't constitute some type of false positive. In addition, the violation bulletins can first be sent to the Admin GUI for verification that the end users identified as being affected are in fact correctly identified. Further, an administrator may, through the Admin GUI, transmit or instruct the management service to transmit, the violation bulletin to the select end users. In still other examples, the management system may process a transaction including a compliance violation and initiate an information request as performed in stage 225, or issue a recommendation that such a request be made by an administrator. Upon receiving the information regarding the transaction from a source requiring an application as part of a request, either the management service, or an administrator through the Admin GUI can analyze the information and determine whether to issue a violation bulletin.

At stage 236, the management service determines overall and product risk scores for providers according to the risk factor scores. As discussed above, the risk factor scores may be determined according to a scoring system that assigns a certain weight to data used to determine a risk factor score. Alternatively, or in addition, an algorithm implemented by the management service to generate a compliance profile based on the risk factor scores can also employ a weighting scheme to the risk factor scores to determine an overall and each product risk score.

In stage 238, the management service can notify an administrator, through the Admin GUI, and the backend server, that new compliance profiles have been generated or updated. In one example, an admin server that implements the management service can include an internal storage in which compliance profiles are stored. In another example, the compliance profiles may be stored in the conversion database maintained by the backend server.

In addition to notifying, and providing new or updated compliance profiles to the Admin GUI in stage 238, the management service can transmit a weighting scheme employed to the Admin GUI. In another optional aspect of the exemplary method of FIG. 2, either the management service or an administrator operating the Admin GUI can transmit the weighing scheme to a scoring system update service at optional stage 239.

In turn, the management service can process the received weighting scheme to determine if the weighting scheme for the scoring system is up to date with weighting schemes from recognized private, regulatory, governmental, or international scoring systems. In stage 241, if an update is needed or recommended, the affected values of the weighting scheme can be transmitted to the Admin GUI and/or the management service as illustrated with the optional feedback loops extending to stages 234 and 236 in FIG. 2. In yet another example, the management service can constantly monitor the scoring system update service, or other related information providers and continually update the weight scheme of the scoring system.

In stage 242, the Admin GUI can receive a request to display a compliance profile for specific provider. The management service, at stage 248, can transmit the requested compliance profile to the Admin GUI for display.

Figure 3:
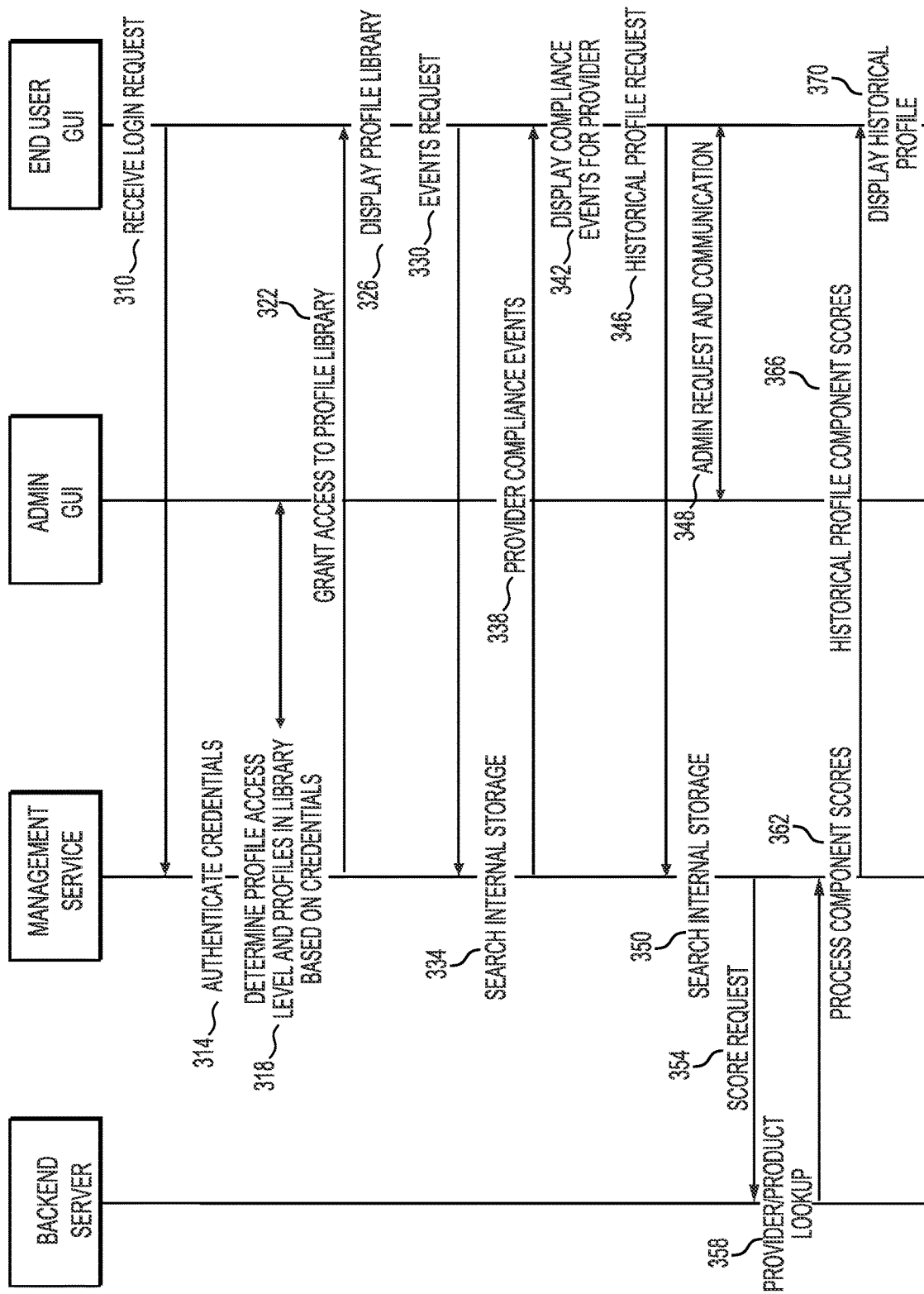
FIG. 3 is a sequence diagram of an example method for authorizing user access to compliance profiles for providers and displaying the compliance profiles in a graphical user interface ("GUI").

FIG. 3 is a sequence diagram of an example method for authorizing end user access to compliance profiles and displaying compliance profiles in an end user GUI. At stage 310, login credentials can be received through the end user GUI and transmitted to the management service. In stage 314, the management service can process and authenticate the credentials, if valid, and perform stage 318. Otherwise, the management service can transmit a message to the end user GUI that access cannot be granted. In stage 318, the management service can determine what level of compliance profile access to grant and the contents of a compliance profile library associated with the credentials entered in stage 310.

In one example, based on subscription choices, some end users may be authorized to receive compliance profiles populated by data from all or fewer information sources available to an admin platform that implements the management service. Thus, the contents (e.g., the depth of information) for compliance profiles in compliance profile libraries can differ for end users, whether individual or a business entity, on a per end user-basis. In another example, access level for end users can be temporally based, and the management service can communicate with the admin GUI where the credentials entered correspond to an expiring access level. A message can be transmitted to the Admin GUI requesting authorization to extend, or let lapse the current access level. In another example, where the credentials entered in stage 310 are being entered into the admin platform by an end user for the first time, the management service can communicate a message to the Admin GUI as part of an additional authentication process for initial logons.

At stage 322, the management service can transmit a compliance profile library identified in stage 318 to the end user GUI, which displays the library in stage 326. In one example, the end user GUI can display a list of providers included in the compliance profile library, and each provider's overall risk score. Filtering options may be available through the end user GUI that allow an end user to isolate and view those providers that: deal with a particular product or group of products; use a particular mode of transport; have an overall risk score within a certain range; have a product risk score for a particular product within a specified range; operate from particular countries; or have been involved with a compliance event during a particular range of time. In addition, the end user GUI can include options an end user can select to get more detailed information.

At stage 330, the end user GUI can receive such a request for compliance events for a particular provider to be displayed. The end user GUI may have ready access to this information or be required to transmit the request to the management service, which may search through an internal storage for compliance events in stage 334. In another example, the end user GUI can display preloaded compliance events and transmit a request to the management service as a check to see if more recent compliance events are available. At stage 338, the management service can transmit one or several compliance events, or a message that no more compliance events are available. In stage 342, based on the response from the management service, the end user GUI can display or update a display of compliance events for a selected provider. In one example, if not already displayed, an end user can select the compliance events to get more details about the events and see how each event impacts a provider's overall risk score or product risk score for any products involved in the selected compliance event.

At stage 346, a request for historical compliance profiles for a provider can be received through the end user GUI. The administration platform can be configured to calculate overall and product risk scores from varying periods of time. For example, an end user may wish to see how a provider's product score with respect to oranges has changed over the last 30 days, 90 days, 1 year, 5 years, 10 years, etc. Depending on the period of time requested, product risk scores may already be loaded or otherwise immediately accessible to the end user GUI. In addition, the period of time for which scores are available to an end user corresponding to the credentials entered in stage 318, may depend on the level of access granted per stage 322.

In other examples, a request for historical risk scores may be transmitted to the management service that searches an internal storage in stage 350. Similar to the end user GUI, the internal storage accessible to the management service may only have scores for a certain limited period of time that may be less than a period requested. As a result, the management service can request historical scores from the backend server at stage 354, which causes the backend server to lookup the requested provider in the conversion database in stage 358.

As components of the administration platform search for historical scores as described, a request for communication with an administrator can be received though end user GUI at stage 348. The request can be routed directly to the Admin GUI or routed through the management service (not shown). The communication may include a request for more information with respect to a particular compliance event or letter, or a particular product movement alert, refusal, or recall. In other examples, an end user can request an application (e.g., a FOIA request) be submitted to an information source for which applications are required and access to respective information is limited. In still other examples, the request could be for access to historical scores for a longer period of time than currently granted to an end user.

Returning to the request for historical scores, at stage 362, the management service can process the scores returned by the backend server for forwarding in stage 366, and display by the end user GUI in stage 370. In one example, the historical scores may be packaged with compliance event information that details how certain compliance events impacted the provider's past risk score.

Figure 4:
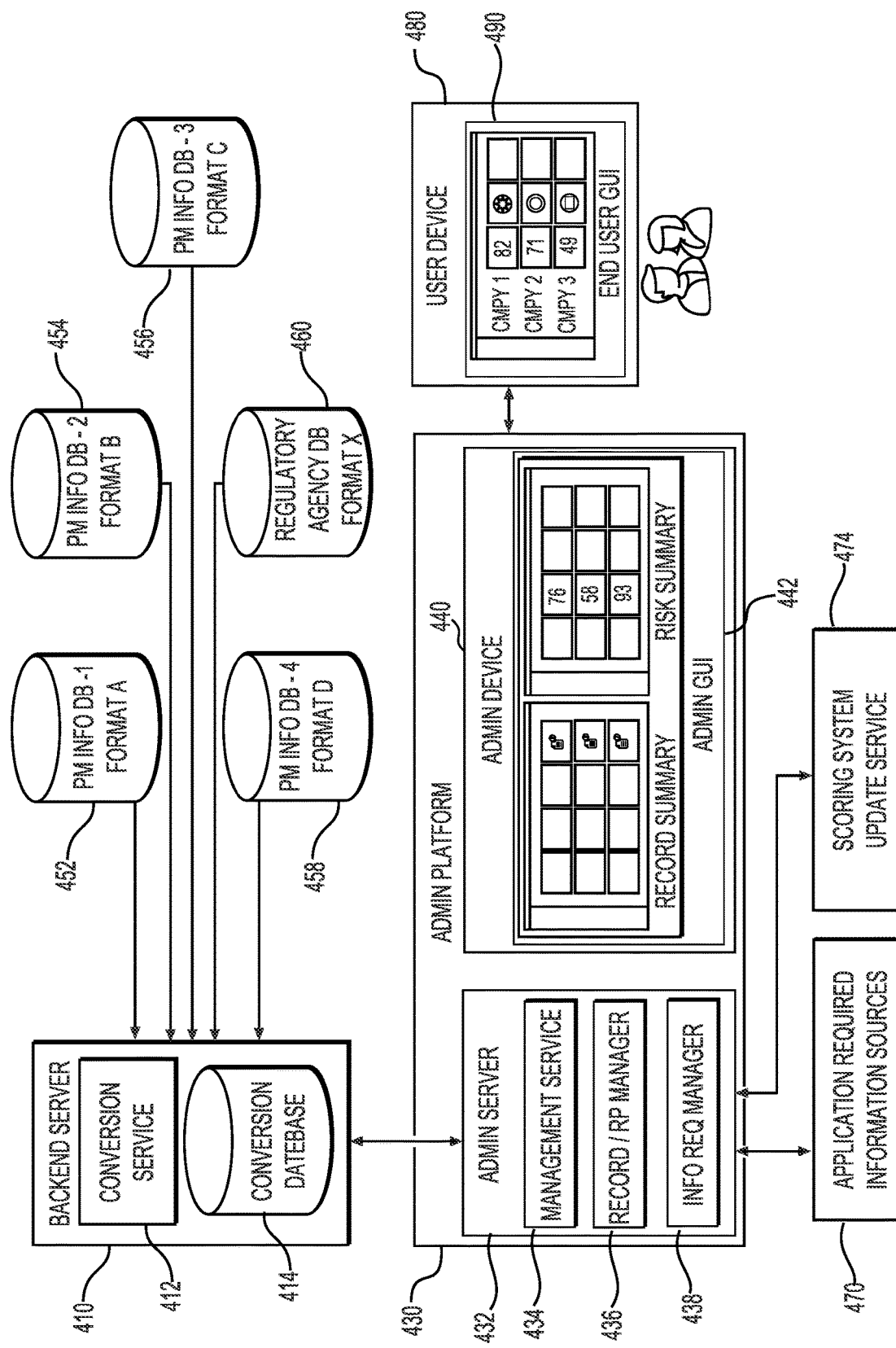
FIG. 4 is an illustration of an example system components for analyzing product movement information and generating compliance profiles for providers.

FIG. 4 illustrates a schematic representing exemplary system components for analyzing product movement information and generating compliance profiles. As shown, the system components can include a backend server 410 and an admin platform 430 provided with an admin server 432 and at least one admin device 440. In one example, each of the backend and admin servers 410, 432 can be provided by one or a group of servers. In another example, the backend and admin server 410, 432 can be provided by one or a single group of networked servers. In still another example, one or both of the backend and admin servers 410, 432 can be a cloud-based virtual server, or have its respective operations managed by cloud-based services. As explained below, the backend server 410 can communicate with a plurality of databases to obtain (raw) product movement information. The admin platform 430 on the other hand, can utilize the admin server 432 to communicate with the backend server 410, the admin device 440, and one or more sources of supplemental information 470, 474.

In one example, the backend server 410 and components of the admin platform 430 can be in communication with each other via an internal, enterprise-maintained network. In another example, communication between the backend server 410 and the admin platform 430, or even between components of the admin platform 430, can be provided through a combination of an in internal network and external network, such as the internet. Communication between the backend server 430 and the databases, as well as communication between a user device 480 and the admin platform 430, can be facilitated through a network such as the internet.

As illustrated, the backend server 430 receives information for first, second, third, fourth, and fifth databases 452, 454, 456, 458, 560 (together "the databases"). In one example, each of these databases stores product movement information in a respective format. As used herein, format can refer to sets of data fields, format of data, and types of data. For example, format A of the first database 452 set may include data fields for provider name, address, and products dealt with. On the other hand, format B of the second database 454 may not include data fields for product groups the provider deals with, modes of transport used by the provider, a certification status, and instead of a provider name field, format B provides a field for a numeric ID issued to each provider.

The fifth database 460, as shown, is a database that is maintained by a regulatory agency, such as the FDA. In one example, each of the databases shown in FIG. 4 can be maintained by a single regulatory agency or a respective regulatory agency. Further, in addition to different data fields, format, and types of data—each database can be a specific source for information a particular type of compliance events. In one example, each database respectively maintains, and is a source of records for a specific one of compliance actions, compliance letters, movement alerts, movement refusals, movement recalls, or other types or even sub-types of compliance events.

The backend server 410 can include a conversion service 412 that processes and aggregates the PM info received from the databases. In particular, the conversion service can parse through the PM info to identify providers or inventories of products moved by a succession of providers.

An inventory example would be 1000 widgets for which a series of product movements were performed as listed in order of performance in Table 4.

TABLE 4

| Order in Series | Product Movement Service Performed |
|---|---|
| 1 | Widgets Made at a facility of Provider A in Country 1 |
| 2 | Divided into two equal lots having lot IDs of XYZ-1 and XYZ-2 |
| 3 | Shipped together as two lots by a shipping company owned by Provider B to a port on the coast of Country 2 |
| 4 | Offloaded together as two lots from the ship by an offloading company of Provider C on to a trailer of a trucking company of Provider D |
| 5 | Transported by Truck of Provider D to and stopped at a First Checkpoint at a border between Country 2 and Country 3 |
| 6 | Reaches Buyer #1 in Country 3 where lot XYZ-1 is Offload again by Provider C |
| 7 | Transported to and stopped at a Second Checkpoint at the border between Country 2 and Country 3 |
| 8 | Reaches Buyer #2 in Country 2, where lot XYZ-2 is Offloaded by Provider E |

In the example above, each provider's dealing with the lots of widgets is a provider transaction with respect to that provider. On the other hand, a product transaction for lot XYZ-1 includes all of the provider transactions until being offloaded at buyer #1. The product transaction for lot XYZ-2 includes all of the provider transactions until being offloaded at buyer #2. A first compliance event involving a compliance action at the port of country 2 may be recorded in the third database 456. On the other hand, a compliance event involving a compliance letter issuing from the second checkpoint between country 2 and country 3 may be stored in the second database 454.

The conversion service 412 of the backend server 410 is configured to parse through the information from the second and third databases 454, 456, identify providers, and group provider transactions together according to the providers responsible, and store the provider transactions together in the conversions database 414. Thus, information regarding the compliance events will be included in the records of provider transactions for providers B (shipping company) and D (trucking company). To the extent the conversion database has a CID for either provider B or D, that CID may be associated with these provider transactions.

Once the transaction information for providers B and D is received at the admin server 432, the management service 434 can process the transactions and assign CDs where needed. Further, the management service 434 can identify the compliance events, generate risk factor scores for each type of compliance event there is one or more scores of, and generate or adjust overall and product risk scores, with respect to product widget, for providers B and D. A record manager 436 can add the transactions to the records of each provider. Should additional information be needed to assign a CID number to either provider B or D, under the instruction of the management service 434 or an admin device 440, an information request manager 438 can coordinate an exchange of information between the management service 434 and application required information sources 470.

Should an administrator wish to view provider transaction records or compliance profiles for either provider B or D, the Admin GUI 442 implemented on the admin device 440 can be used. In practice, as will be described in more detail with reference to FIG. 10, an administrator can utilize the Admin GUI 442 to modify a scoring system and have overall and individual product risk scores updated. Another way for the scoring system to be updated is through a communication between the management service 434 and a scoring system service 474.

Like the administrator, an end user can review provider compliance profiles via an end user GUI 490 implemented on a user device 480. Both the admin device 440 and the user device 480 can be any computing device such as a mobile phone, laptop, computer, tablet, or the like, that includes one or more processors and memory storage locations.

Figure 5:
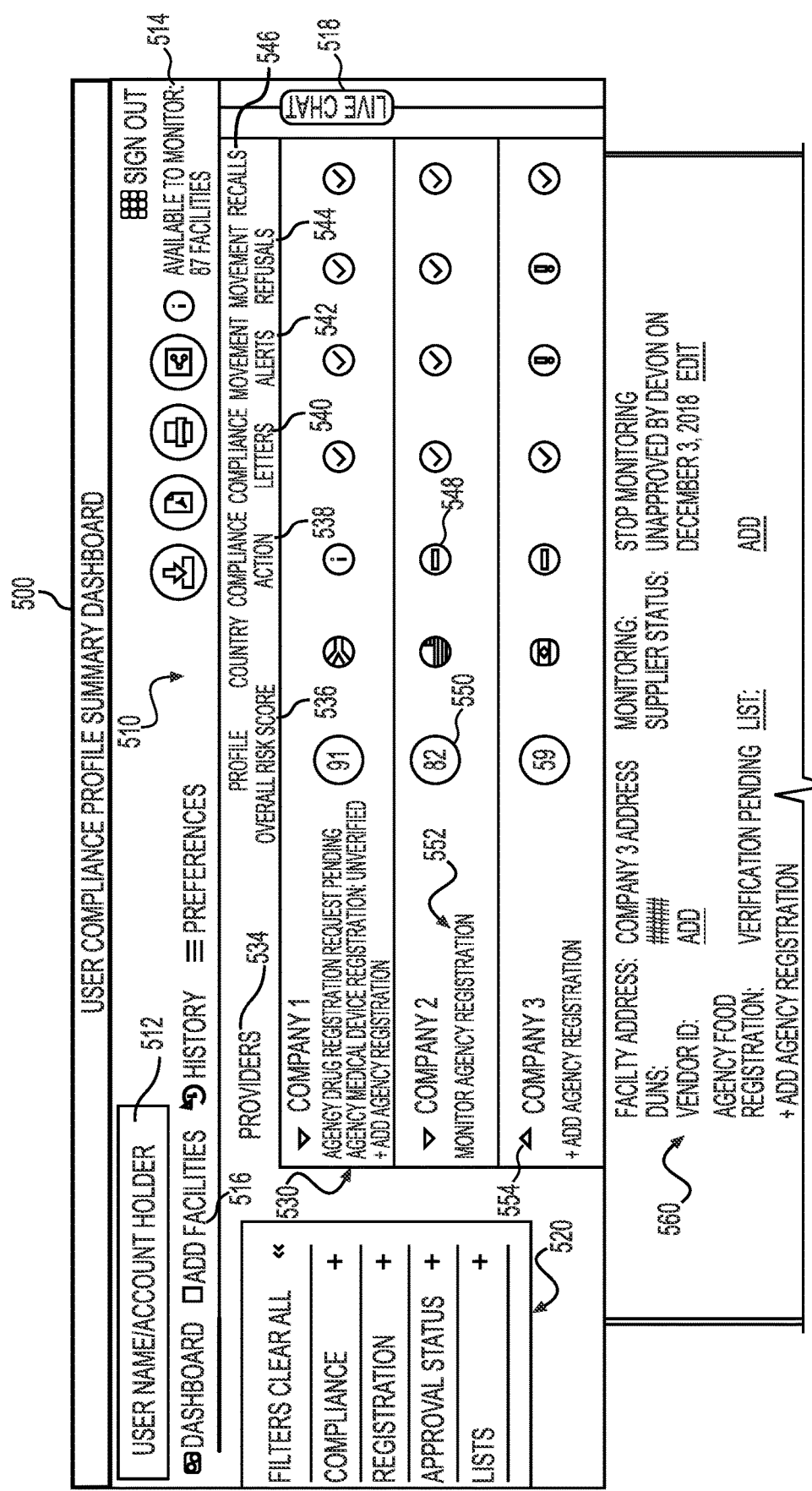
FIGS. 5 and 5 (Cont.) provide an illustration of an exemplary end user GUI that enables review of compliance profiles of providers associated with an end user account.
Figure 5:
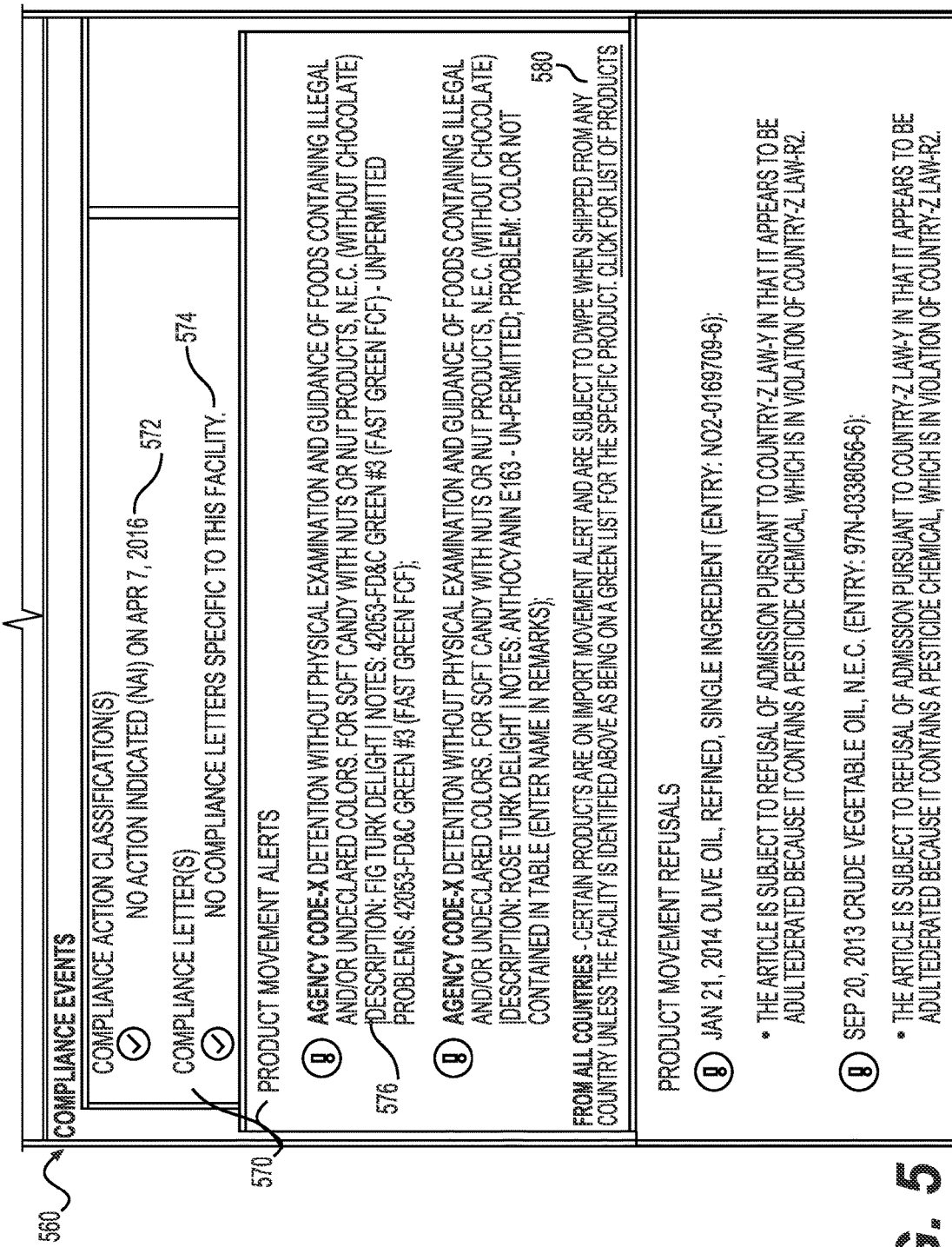

FIGS. 5 and 5 (Cont.) provide illustrations of portions of an exemplary end user GUI 500 that presents a dashboard for reviewing compliance profile summaries for providers associated with an end user account ("user compliance profile summary dashboard"). The GUI 500 includes a menu bar 510, a filter option menu 520, and a compliance profile summary table 530.

As illustrated, the menu bar 510 includes fields for an account holder name 512 and a number of (tracked) facilities 514, an add facility option 516, and an admin communication option 518. The filter menu 520 can enable an end user to triage the providers the user wants to review based on types of compliance events or violations providers have been involved with, registrations held, approvals obtained, or combinations of these categories. In addition, each filter category may expand to reveal options for filtering not only based on value types for the categories (e.g., code 1 compliance alert, food registration verified, approval pending, etc.), but also according to temporal parameters (e.g., compliance events of a particular type over the last year, registration lapses within the next 30 days, at least 5 approvals over the last 3 years, etc.). In addition, a user may have created sub-lists of the providers or facilities being tracked that may be accessible by expanding the list option in the filter section 530.

The compliance profile summary table 530 is organized into columns, the first being a provider column 534 including the names of providers included in a library established for an account held by an individual or entity displayed in the account holder name field 512. Other columns of the summary table 530 can include columns for compliance profile overall risk score 536, country (not designated), compliance action 538, compliance letters 540, movement alerts 542, movement refusals 544, and recalls 546.

Each of the columns to the right of the country column, can, in one example, represent a risk factor for which a score is determined. As previously discussed, each risk factor score is based on a combination the scores for the compliance events of a respective type attributed to a provider over a period of time. In one example, the different icons correspond to where a composite (i.e., based on the scores of all events of that type) score for a corresponding risk factor falls on a scale (e.g., 1 to 10, 1 to 100, etc.). In another example, the different icons 548 can indicate how recently or frequent a provider, and/or products the provider deals with, involved in or subject to each of several types of compliance events.

A compliance profile according to the present disclosure is a holistic assessment of a provider's past performances of manufacturing, producing, and/or transporting products, generally with respect to the occurrence of issues that can result from provider practices that are inconsistent with requirements of governmental, international, or other regulatory regimes. These are issues that can result in delays, seizures, destruction, or warnings that could increase the chances for one of the other issues to occur in a subsequent similar transaction by a provider. In order to capture this aspect of the present disclosure, the compliance profile summary table 530 provides a snapshot of each listed provider's past performances resulting, or not resulting in each of several types of compliance events. However, in order to convey, in an easily appreciable manner, a provider's general capacity to perform and be compliant, and thus avoid issues that may be costly, a compliance profile overall risk score 550 is included in the compliance profile summary table for each provider listed.

The risk compliance summary table 530 also includes a registration status 552 and an expansion option 554 for each provider listed. Selection of the expansion option 554 can reveal a facility summary 560 for each of that provider's facilities being tracked by the account holder logged into the end user GUI 500. The facility summary 560 can include name and address information as shown, as well as various identifiers associated with any facility listed therein, as well as types of registrations (e.g., medical device registration, food registration, etc.) and corresponding registration numbers.

In addition, as illustrated in FIG. 5 (Cont.), the facility summary 560 for each facility revealed when the expansion option 554 is selected, can include a list of recent compliance events. In particular, the compliance events can be organized by compliance event type 570. One or more compliance event types 570 in the facility summary 560 can include a lack of status explanation 572. This type of message may indicate, generally, the non-occurrence of a compliance event where one may be expected for a particular product movement service or particular phase of supplying products to a buyer from a manufacturer. Other messages 574 may indicate more explicitly that a compliance event has not occurred. On the other hand, detailed description 576 may be included for each full-fledged compliance event reported by the facility summary 560. In addition, any disclaimer, qualifier, compliance type-specific condition 580 may be included in a section of the facility summary 560 including reports for those types of compliance events.

Figure 6:
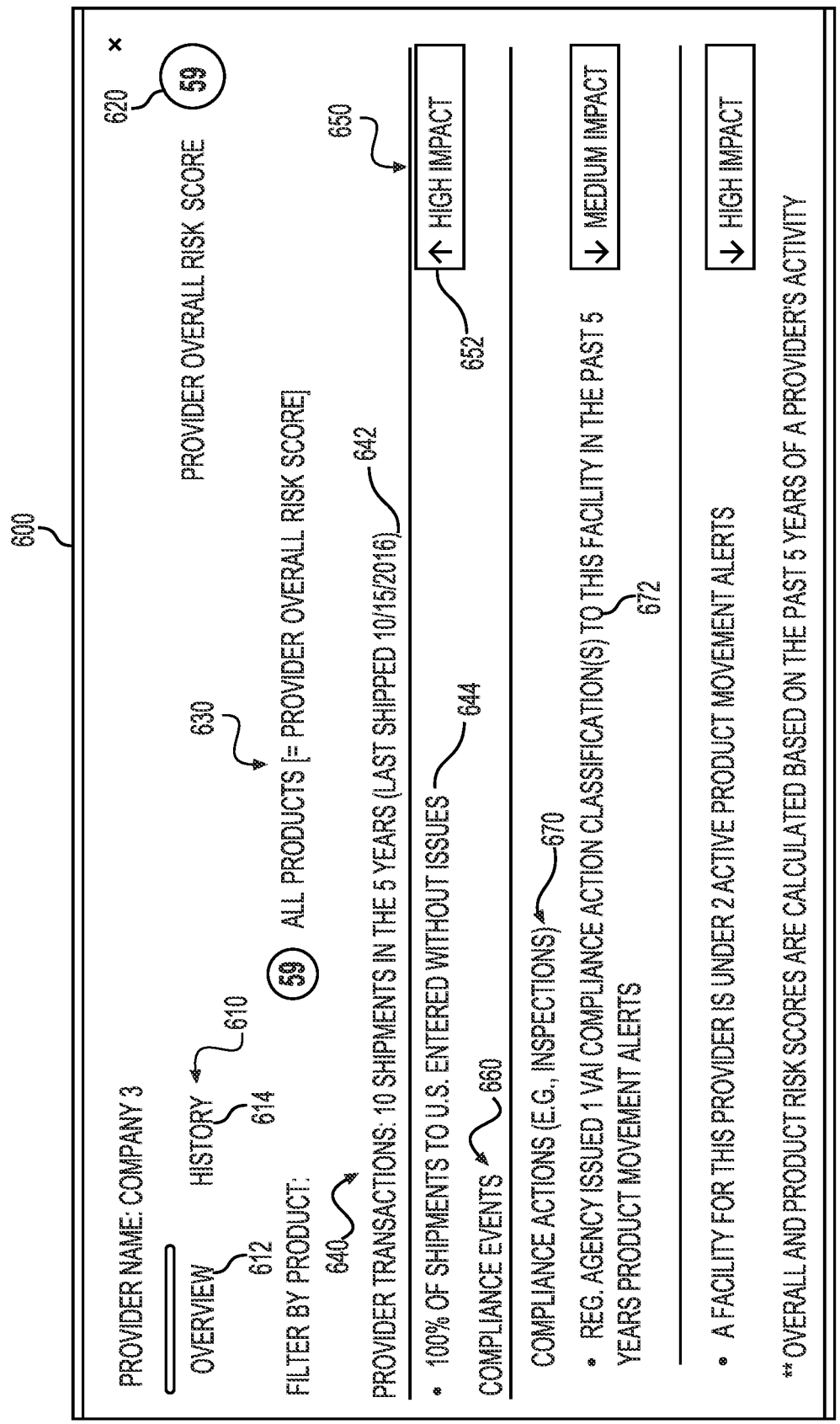
FIG. 6 is an illustration of an exemplary GUI that presents, to an end user, detailed information on components of a compliance profile for a provider selected from another GUI screen.

In addition to selecting the expansion option 554, the name of each provider listed in the provider column 534 may be selected by a user to obtain more detailed information regarding that provider's compliance profile. FIG. 6 is an illustration of an exemplary GUI 600 that presents, to an end user, detailed information on components of a compliance profile for a provider selected from another GUI. In particular, FIG. 6 illustrates a view of an overview tab that provides, and can be interacted with to provide, detailed information about overall and product risk scores, the compliance events impacting those scores, and details regarding those compliance events.

As shown in FIG. 6, the GUI 600 includes a tab section 610, an overall score 620, a filter option 630, and activity description section 640, a score impact section 642, and a compliance event summary section 660. The tab section 610 includes an overview tab 612 corresponding to the GUI 600, and a history tab 614 that when selected, brings up a GUI that will be described with reference to FIG. 7.

The filter option 630 can be utilized by a user to select and review a provider's overall score for all products it deals with as shown. Every item of information in the activity description, score impact, and compliance event sections 640, 650, 660 is specific to a product (or the all products option which is shown) selected in the filter option 630. The activity description section 640 can include a brief description 642 of product movement related services by the provider over a certain period of time, as well as summary 644 of the results from providing those services. The score impact section 650 can indicate, with a graphic 652, the score displayed in the filter option 630 is impacted by the product movement services described to the left the score impact section 650. In one example, an impact rating of high, medium, or low can be indicated for the results 644 of the summarized activity 642, and each compliance event 672 listed under a particular event type 670 in the compliance event section 660. As will be understood, using the filter option 630 to select a product will result in information in the activity description, score impact, and compliance event sections 640, 650, 660 changing to include components of the company 3's compliance profile that are only applicable company 3's activity with respect to that product.

Figure 7:
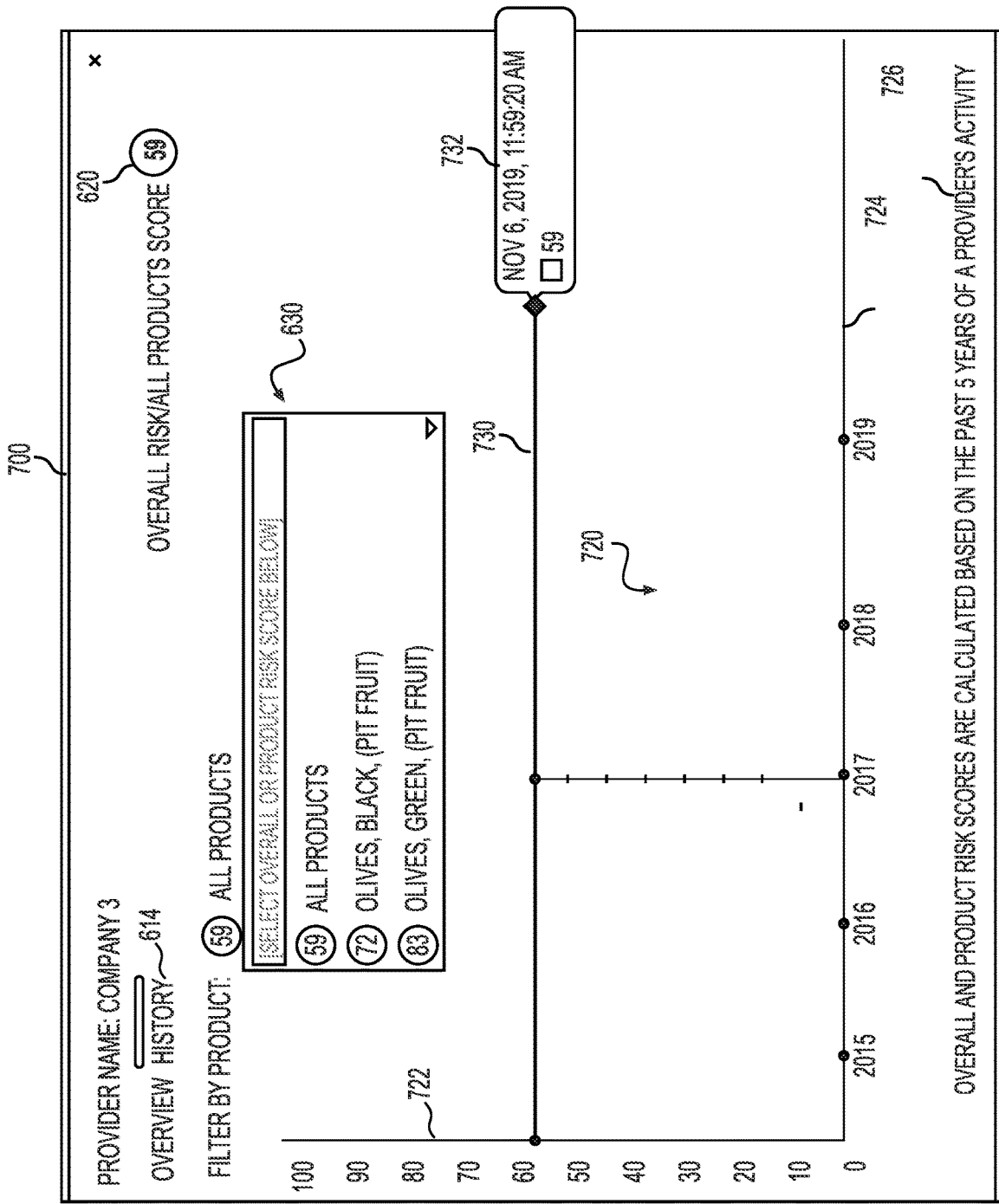
FIG. 7 is an illustration of an exemplary GUI that presents, to an end user, historical information regarding different score components of a selected provider's compliance profile.

FIG. 7 is an example illustration of a GUI 700 for delivering, to an end user, detailed historical compliance profile score information regarding a selected provider. The GUI 700 also includes the tab section 610 for which selection of the history tab 614 is indicated, the provider's overall risk score 620, and the filter option 630. In addition, the GUI 700 includes a graph section 720 that plots a score 722 over time 724 of a prescribed period 726 with a line graph 730. The graph section 720 includes a plot of scores over time for a product, or the all products option, having been selected in the filter option 630. FIG. 7 therefore shows Company 3's overall score for all products from 2015 through 2019. In one example, hovering over any portion of the line graph 630 causes a box to appear that includes the providers score for the point in time corresponding to the position of the cursor along the x-axis (i.e., time).

Figure 8:
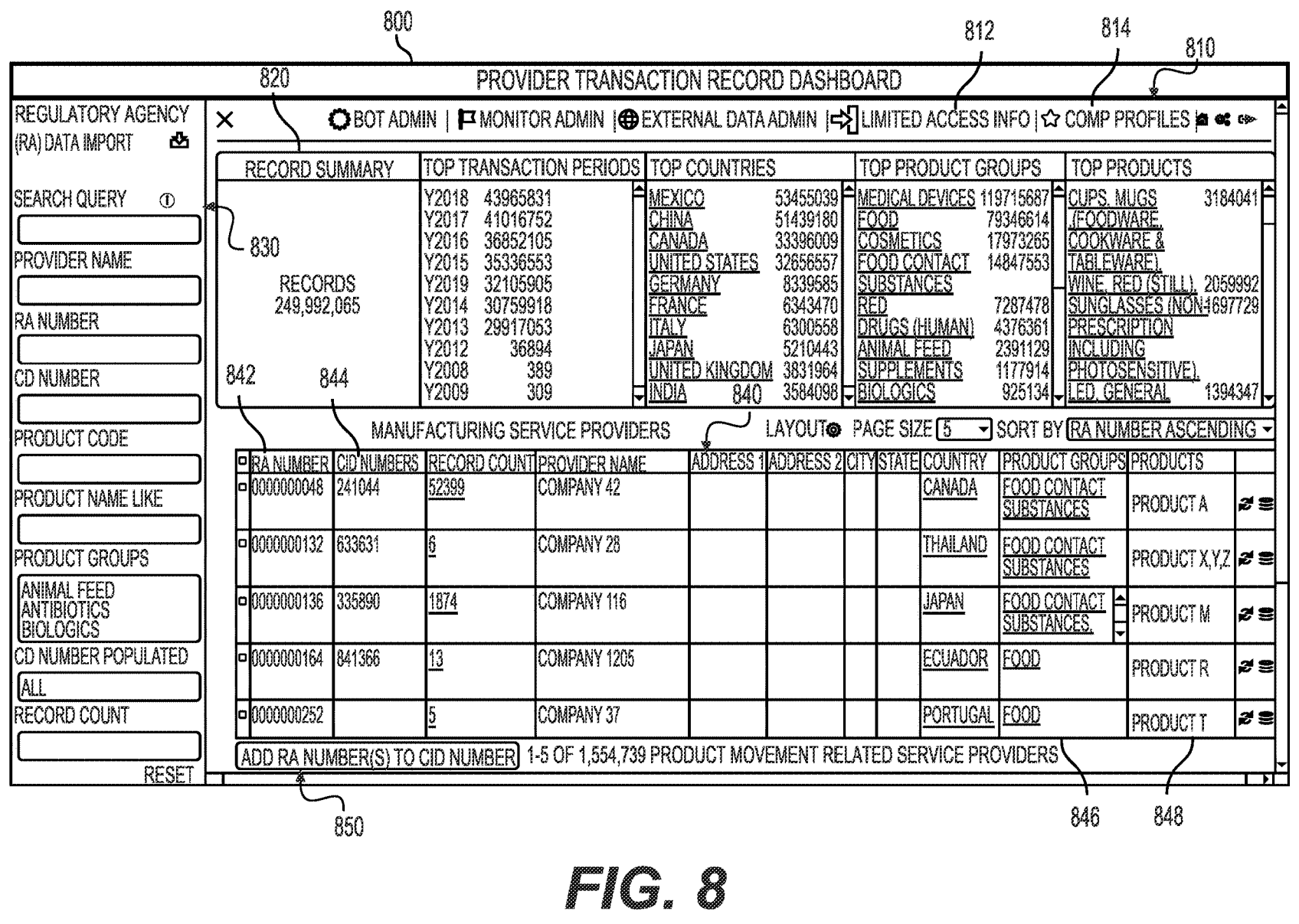

FIG. 8 is an example illustration of a GUI 800 for delivering, to an administrator, product movement transaction records associated with providers that may be selectively tracked. As shown, the GUI 800 includes a menu bar 810, a record summary 820, a search console 830, a record summary table 840, and an identifier linking option 850.

The menu bar 810 includes an information request option 812 and a compliance profile option 814. Selection of the information request option 812, coupled with the selected of one or more records listed in the record table 840 can, in some examples, cause an application for information to be created and forwarded to an information source that limits access to information it stores, such as, the application required information sources 470 of FIG. 4. On the other hand, selection of the compliance profile option 814 can cause an admin compliance profile summary dashboard, as shown in FIG. 9, to be displayed. Where the selection of the profile option 814 is coupled with a prior selection of one or more of the records in the record summary table 840, the GUI 900 will include compliance profiles for those providers corresponding to the selected records. Otherwise, a table with all compliance profile summaries may be generated for the GUI 900.

The search console 830 can be used to search by, among other fields, product codes assigned to different products by a regulatory agency, such as the FDA. Using this search option and the compliance profile selection option 814, an administrator could identify all the providers for one or group of product codes, and then compare the compliance profiles for those providers with respect to those products.

The record summary table 840 includes columns for a regulatory agency ("RA") number 842, a controlling identifier (CID) number 844, a provider name (not designated), product groups 846, and products 848. Each record in the summary table can correspond to a provider transaction for which at least the provider name, product group, and product fields will be populated. However, as previously discussed, product movement information for different information sources, such as the FDA's Import Alert, Import Refusal, Enforcement Action, Inspection Classification, and Warning Letter Databases, may not catalog transactions according to a global regulatory agency number, or at all and just include a provider name.

The identifier linking option 850 addresses this issue by providing a mechanism to mine records that already include one or both RA and CID numbers, and attempt to match the providers associated with those records to the providers listed in records for which a CID number, at a minimum, is not included in the transaction record. In another example, selection of the identifier linking option 850 calls another GUI that allows an administrator to populate one or both of these values where the administrator is able to match the provider of the transaction to a previously assigned CID. In another example, the identifier linking option 850 can be used by an administrator to initiate a CID number creation process or request.

FIG. 9 is an illustration of an exemplary GUI that presents, to an administrator, compliance profile summaries for selected providers, and includes selectable options for accessing detailed score information for different components of a compliance profile. The GUI 900 includes a menu including a limited access information option 912, a transaction record summary option 814, and score type designator 916. The GUI 900 also includes a search console 920 and an overall risk score summary table 930. The search console 920 can be used to filter out or search for providers that deal with a particular product and/or have an overall risk score within specified range. The overall risk score summary table 930 includes a score column 932. A score value 934, if one has been determined, may be provided as a clickable link. Selection of any one score may cause a score detail GUI, as shown in FIG. 10 to be called and displayed.

FIG. 10 is an illustration of an exemplary GUI 1000 for enabling an administrator to review detailed score information for profile components and modify algorithmic components used for score determinations. The GUI 1000 includes a provider information section 1010, product code section 1020, risk factor score weight values section 1030, product risk scores section 1040, a risk factor score section 1050, and an overall score section 1060.

In one example, an administrator can expand the various sections illustrated in FIG. 10, to obtain a breakdown of score values for products, providers, risk factors, and transactions. This allows an administrator to pinpoint what compliance events or transactions are impacting overall and/or product risk scores. As a result, and administrator would be able to provide a subscriber with extremely specific information about a provider's activity. For example, an overall risk score for a provider that subscriber frequently deals may have gone down 5% in the last 60 days. The subscriber may contact an administrator, as in stage 348 of the method illustrated in FIG. 3, via, for example, the admin communication option 518 in GUI 500, to find out why. The administrator would be able use GUI 1000 to tell the subscriber exactly which transactions, the services provided, and the products dealt with impacted the provider's score and by how much.

In another example, the GUI 1000 can be used by an administrator to change weight values, variables, time coefficients, and/or multipliers used to determine transactions scores, compliance event scores, product scores, and overall scores.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for analyzing product movement information and generating compliance profiles, comprising:
    accessing, with at least one server, a plurality of external information sources including at least one database including data stored in a format according to data fields specific to the at least one database;
    aggregating, with the at least one server, product movement information from the plurality of external information sources having respective formats and converting the product movement information into provider transactions;
    identifying, with the at least one server, compliance events in the provider transactions;
    generating, with the at least one server, risk factor scores for first providers based on applications of a scoring system to the provider transactions and compliance events respectively associated with the first providers;
    generating, with the at least one server, compliance profiles for the first providers based on respective risk factor scores, each compliance profile including at least an overall risk score for a respective first provider;
    receiving a first request for a compliance profile associated with at least one first provider; and
    causing the compliance profile to be displayed on a graphical user interface ("GUI") based on the first request,
    wherein at least one of the compliance profiles for a first provider includes at least two product risk scores for at least one product and a respective overall risk score, wherein the respective overall risk score is determined based on the at least two product risk scores, and wherein the at least two product risk scores are determined based on at least one provider transaction for the first provider involving the at least one product.

2. The method of claim 1, wherein at least one of the external information sources includes a database maintained by a regulatory agency.

3. The method of claim 1, further comprising:
    comparing the first providers to second providers, each of the second providers having been previously identified and assigned a respective controlling identifier; and
    assigning, to one first provider that is matched to one second provider, a controlling identifier assigned to the one second provider.

4. The method of claim 1, further comprising:
    generating a historical compliance profile for the at least one product based on respective product risk scores over a first period of time;
    receiving a second request for the historical compliance profile, the second request including a second period of time equal to or less than the first period of time; and
    causing a portion of the historical compliance profile corresponding the second period of time to be displayed on the GUI based on the second request.

5. The method of claim 1, further comprising determining the at least two product risk scores based on respective risk factor scores for one risk factor corresponding to a first type of compliance event.

6. The method of claim 5, wherein determining the respective risk factor scores includes applying recency coefficients to compliance events of the first type associated with the at least two product risk scores, and wherein a value of each recency coefficient is set based on a date that a respective compliance event of the first type occurred.

7. The method of claim 5, wherein the scoring system includes a score value for the compliance event of the first type corresponding to an estimate of an impact on an ability of the first provider to provide product movement services involving the at least one product.

8. A non-transitory, computer-readable medium containing instructions that, when executed by a hardware-based processor, performs stages for analyzing product movement information and generating compliance profiles, the stages comprising:
    accessing, with at least one server, a plurality of external information sources including at least one database including data stored in a format according to data fields specific to the at least one database;
    aggregating, with the at least one server, product movement information from the plurality of external information sources having respective formats and converting the product movement information into provider transactions;
    identifying, with the at least one server, compliance events in the provider transactions;
    generating, with the at least one server, risk factor scores for first providers based on applications of a scoring system to provider transactions and compliance events respectively associated with the first providers;
    generating, with the at least one server, compliance profiles for the first providers based on respective risk factor scores;
    receiving a first request for a compliance profile associated with at least one first provider; and
    causing the compliance profile to be displayed on a graphical user interface ("GUI") based on the first request,
    wherein at least one of the compliance profiles for a first provider includes at least two product risk scores for at least one product and a respective overall risk score, wherein the respective overall risk score is determined based on the at least two product risk scores, and wherein the at least two product risk scores are determined based on at least one provider transaction for the first provider involving the at least one product.

9. The non-transitory, computer-readable medium of claim 8, wherein at least one of the external information sources includes a database maintained by a regulatory agency.

10. The non-transitory, computer-readable medium of claim 8, the stages further comprising:
comparing the first providers to second providers, each of the second providers having been previously identified and assigned a respective controlling identifier; and
assigning, to one first provider that is matched to one second provider, a controlling identifier assigned to the one second provider.

11. The non-transitory, computer-readable medium of claim 8, the stages further comprising:
generating a historical compliance profile for the at least one product based on respective product risk scores over a first period of time;
receiving a second request for the historical compliance profile, the second request including a second period of time equal to or less than the first period of time; and
causing a portion of the historical compliance profile corresponding the second period of time to be displayed on the GUI based on the second request.

12. The non-transitory, computer-readable medium of claim 8, the stages further comprising determining the at least two product risk scores based on respective risk factor scores for one risk factor corresponding to a first type of compliance event.

13. The non-transitory, computer-readable medium of claim 12, wherein determining the respective risk factor scores includes applying recency coefficients to compliance events of the first type associated with the at least two product risk scores, and wherein a value of each recency coefficient is set based on a date that a respective compliance event of the first type occurred.

14. The non-transitory, computer-readable medium of claim 12, wherein the scoring system includes a score value for the compliance event of the first type corresponding to an estimate of an impact on an ability of the first provider to provide product movement services involving the at least one product.

15. A system for analyzing product movement information and generating compliance profiles, comprising:
a memory storage including a non-transitory, computer-readable medium comprising instructions; and
a computing device including a hardware-based processor that executes the instructions to carry out stages comprising:
accessing, with at least one server, a plurality of external information sources including at least one database including data stored in a format according to data fields specific to the at least one database;
aggregating, with the at least one server, product movement information from the plurality of external information sources having respective formats and converting the product movement information into provider transactions;
identifying, with the at least one server, compliance events in the provider transactions;
generating, with the at least one server, risk factor scores for first providers based on applications of a scoring system to provider transactions and compliance events respectively associated with the first providers;
generating, with the at least one server, compliance profiles for the first providers based on respective risk factor scores;
receiving a first request for a compliance profile associated with at least one first provider; and
causing the compliance profile to be displayed on a graphical user interface ("GUI") based on the first request,
wherein at least one of the compliance profiles for a first provider includes at least two product risk scores for at least one product and a respective overall risk score, wherein the respective overall risk score is determined based on the at least two product risk scores, and wherein the at least two product risk scores are determined based on at least one provider transaction for the first provider involving the at least one product.

16. The system of claim 15, wherein at least one of the external information sources includes a database maintained by a regulatory agency.

17. The system of claim 15, the stages further comprising:
comparing the first providers to second providers, each of the second providers having been previously identified and assigned a respective controlling identifier; and
assigning, to one first provider that is matched to one second provider, a controlling identifier assigned to the one second provider.

18. The system of claim 15, the stages further comprising:
generating a historical compliance profile for the at least one product based on respective product risk scores over a first period of time;
receiving a second request for the historical compliance profile, the second request including a second period of time equal to or less than the first period of time; and
causing a portion of the historical compliance profile corresponding the second period of time to be displayed on the GUI based on the second request.

19. The system of claim 15, wherein one risk factor corresponds to a type of compliance event, and wherein one risk factor score is determined based on a total of compliance events of the type corresponding to the one risk factor.

20. The system of claim 19, wherein determining the respective risk factor scores includes applying recency coefficients to compliance events of the first type associated with the at least two product risk scores, and wherein a value of each recency coefficient is set based on a date that a respective compliance event of the first type occurred.

* * * * *